United States Patent [19]
Ouchi et al.

[11] Patent Number: 5,678,933
[45] Date of Patent: Oct. 21, 1997

[54] SPEED SENSING ROLLING BEARING UNIT

[75] Inventors: Hideo Ouchi; Kouichi Morita; Hayato Oumi, all of Fujisawa, Japan

[73] Assignee: NSK Ltd., Tokyo, Japan

[21] Appl. No.: 585,194

[22] Filed: Jan. 11, 1996

[30] Foreign Application Priority Data

| Jan. 20, 1995 | [JP] | Japan | 7-007376 |
|---|---|---|---|
| Aug. 3, 1995 | [JP] | Japan | 7-198411 |
| Aug. 4, 1995 | [JP] | Japan | 7-199749 |
| Aug. 9, 1995 | [JP] | Japan | 7-203077 |
| Aug. 9, 1995 | [JP] | Japan | 7-203078 |
| Aug. 9, 1995 | [JP] | Japan | 7-203079 |
| Sep. 14, 1995 | [JP] | Japan | 7-236584 |

[51] Int. Cl.$^6$ ............................................. F16C 33/30
[52] U.S. Cl. ............................................. 384/448
[58] Field of Search ............................ 384/448, 446, 384/544; 374/173, 174

[56] References Cited

U.S. PATENT DOCUMENTS

| 4,774,463 | 9/1988 | Mizobuchi et al. | 384/448 |
|---|---|---|---|
| 5,166,611 | 11/1992 | Kujawa et al. | 384/448 |

FOREIGN PATENT DOCUMENTS

| 57-34457 | 2/1982 | Japan. |
|---|---|---|
| 61-74870 | 5/1986 | Japan. |
| 62-170363 | 10/1987 | Japan. |
| 62-249069 | 10/1987 | Japan. |
| 62-297530 | 12/1987 | Japan. |
| 63-191020 | 8/1988 | Japan. |
| 2-101273 | 8/1990 | Japan. |
| 3-44251 | 7/1991 | Japan. |
| 4-94568 | 8/1992 | Japan. |
| 6-347241 | 12/1994 | Japan. |
| 6-347289 | 12/1994 | Japan. |

*Primary Examiner*—Lenard A. Footland
*Attorney, Agent, or Firm*—Evenson, McKeown, Edwards & Lenahan, P.L.L.C.

[57] ABSTRACT

A speed sensing rolling bearing unit having a hub rotating together with a vehicle wheel, a tone wheel fixed to the hub and made from a light-shielding material circumferentially provided with a number of light transmitting portion or a non-reflecting material circumferentially provided with a number of light-reflecting portions, a dover having a synthetic resin block in it, and a sensor embedded in the synthetic resin block and comprising a light-emitting element and a light-receiving element which receives the light from the light-emitting element intermittently as the hub rotates.

9 Claims, 24 Drawing Sheets

SPEED SENSING ROLLING BEARING UNIT

BACKGROUND OF THE INVENTION

1. Field of the Invention

The present invention relates to a rolling bearing unit fitted with a rotational speed detection unit (referred to hereunder as a speed sensing rolling bearing unit), used for rotatably supporting a vehicle wheel on a suspension unit, and detecting the rotational speed of the wheel.

2. Description of the Related Art

There are various well known constructions for speed sensing rolling bearing units for rotatably supporting a vehicle wheel on a suspension unit, and detecting the rotational speed of the wheel in order to control an anti-lock braking system (ABS) or a traction control system (TCS). The rotational speed detection units fitted to such speed sensing rolling bearing units generally comprise a tone wheel which rotates together with the vehicle wheel, and a sensor which outputs an output signal which changes at a frequency proportional to the rotational speed of the tone wheel. For the tone wheel and the sensor, there are various well known types.

FIG. 25 shows one such construction as disclosed in Japanese Patent First Publication KOKAI No. 3-6458. A hub 1 constituting a rotating ring is formed with a flange 2 for wheel fixture, on an outer peripheral face of its axially outer end (here the term "axially outer" means the outer side in a widthwise direction of the vehicle when fitted thereto; the left hand side e.g. in FIG. 25), while an outer peripheral face of its axially central portion is formed with an inner ring raceway 3a (rotating side race surface) and a step 4. An inner ring 5 also constituting a rotating ring, is formed with an inner ring raceway 3b on an outer peripheral face thereof, and externally fitted to the outer peripheral face of the hub 1, with an axially outer end face thereof abutted against the step 4.

The outer peripheral face of the axially central portion of the hub 1 and the outer peripheral face of the inner ring 5 are sometimes referred to as "second peripheral face" in this specification. The inner ring raceways 3a, 3b are the rotating race surface. The hub 1 and the inner ring 5 are sometimes referred to as "inner ring assembly".

A spline 1a is formed on an inner peripheral face of the hub 1. A drive shaft which is rotationally driven through a constant velocity joint (not shown) is engaged with the spline 1a to thereby drive the hub 1. In the condition where the hub 1 etc. are assembled in a vehicle, an axially inner end face (here the term "axially inner" means the side towards the widthwise center of the vehicle when fitted thereto; the right hand side e.g. in FIG. 25) of the inner ring 5 is abutted against a shoulder portion of the constant velocity joint, thereby preventing the inner ring 5 from loosening from the outer peripheral face of the hub 1.

A fixed ring member 7 (referred to hereunder as the outer ring member 7) is located around the hub 1, and is provided with an attachment portion 8 on an outer peripheral face of an axially central portion thereof, for securing the outer ring member 7 to a suspension unit. An inner peripheral face of the outer ring member 7 is formed with respective outer ring raceways 9a, 9b, opposite to the inner ring raceways 3a, 3b. A plurality of rolling elements 10 are respectively provided between the inner ring raceways 3a, 3b and the outer ring raceways 9a, 9b, so that the hub 1 is free to rotate inside the outer ring member 7.

The outer ring member 7 is sometimes referred to as first peripheral face and the outer ring raceways 9a, 9b are referred to as fixed race surface.

Seal rings 11 are fitted between the inner peripheral faces on the axially opposite ends of the outer ring member 7, and the mating outer peripheral faces of the hub 1 and the inner ring 5, to cover the opposite end openings of the space in which the plurality of rolling elements 10 are provided, between the inner peripheral face of the outer ring member 7 and the outer peripheral faces of the hub 1 and the inner ring 5.

A tone wheel 16 formed in an annular shape from a magnetic material, is externally secured to a outer peripheral face of the central portion of the hub 1 at a portion between the two rows of rolling elements 10. Gear tooth shaped recesses/protrusions are formed on the outer peripheral face of the tone wheel 16, so that the magnetic characteristics around the peripheral direction thereof change alternately at an even pitch. An end face of a sensor 6, which passes through the outer ring member 7, is faced to the outer peripheral face of the tone wheel 16. The sensor 6 is made with a permanent magnet and a magnetic detection element such as a Hall element or a magnetic reluctance element housed inside. During operation of the speed sensing rolling bearing unit of the above construction, when the tone wheel 16 rotates together with the hub 1, the density of the magnetic flux flowing inside the sensor 6 faced to the tone wheel 16 changes. As a result, a signal obtained from the magnetic detection element section of the sensor 6 changes at a frequency proportional to the rotational speed of the hub 1. Therefore, if the output signal of the sensor 6 is input to a control unit (not shown in the figure), then the rotational speed of a vehicle wheel, rotating together with the hub 1, can be detected, thus enabling control of an anti-lock braking system (ABS) or a traction control system (TCS).

As an alternative construction, Japanese Utility Model First Publication KOKAI No. 2-101273 discloses a speed sensing rolling bearing unit having a construction such as shown in FIGS. 26 and 27. With this speed sensing rolling bearing unit, a tone wheel 16 made by forming a metal plate into a generally annular shape of L-shape in cross section, is externally secured to an outer peripheral face of an inner ring or rotating ring 5, while a sensor 6 is secured to an inner peripheral face of an outer ring or fixed ring 7.

The sensor 6 is formed in a generally annular shape and provided with a pair of axially separated inner peripheral edges, where a light emitting element such as a semiconductor laser or light emitting diode, and a light receiving element such as a phototransistor arranged are faced to each other with an outer peripheral portion of the tone wheel 16 therebetween. A plurality of apertures (light transparent portions) 19 are provided intermittently at even spacing in the outer peripheral portion of the tone wheel 16, at the portion located between the light emitting element and the light receiving element.

With the speed sensing rolling bearing unit constructed as described above, light is intermittently transmitted to the light receiving element of the sensor 6 during rotation of the inner ring 5. The time interval in which light is transmitted to the light receiving element of the sensor 6 changes with the rotational speed of the inner ring 5. Therefore the rotational speed of the inner ring 5 and the member fixed thereto, can be determined from the signal from the sensor 6.

With the heretofore known speed sensing rolling bearing units constructed and operated as described above, detection accuracy is good if the traveling speed of the vehicle is relatively fast, however it is difficult to maintain sufficient accuracy at the time of very slow speeds. The reason for this is as follows:

In order to reliably carry out rotational speed detection, it is necessary for the output from the sensor 6 to be relatively large. However, with the construction of the first conventional example shown in FIG. 25, the change in the density of the flux flowing in the sensor 6 must be large for a large output from the sensor 6. Since the flux flowing in the sensor 6 forms a closed circuit which includes the tone wheel 16, then the facing area of the tone wheel 16 and the end face of the sensor 6 must be increased to some extent to increase the amount of flux flowing in the tone wheel 16. However to increase the facing area, the circumferential length of the recesses and protrusions alternately formed in the outer peripheral face of the tone wheel 16 must be increased by a certain amount. Hence, the pitch of these recess/protrusions cannot be made very fine. For example, with the construction shown in FIG. 25, the number of recesses/protrusions must be kept to around 50 at the most, in order for the size of the output of the sensor 6 to be at an adequate practical level.

Instead of the tone wheel 16 shown in FIG. 25 formed with gear tooth shaped recesses/protrusions on the outer peripheral face thereof, there is also a known device wherein apertures or cut-outs are formed in an annularly shaped magnetic metal plate. With this type of tone wheel, in order to maintain the amount of flux flowing therein, it is necessary for the plate thickness of the magnetic metal plate to be relatively thick. The formation of apertures or cut-outs in such a thick magnetic metal plate however requires a punching or a cutting process, and with such a process, the space between adjacent apertures or cut-outs cannot be made very narrow. Consequently, in the case of a tone wheel with apertures or cut-outs, it is also necessary from the processing point of view to keep the number of apertures or cut-outs to less than 50.

However, when the vehicle is traveling at a very low speed, in order to accurately detect the traveling speed, that is to improve detection accuracy, it is necessary for the number of changes in the sensor output during one revolution of the hub 1 to be large. For example in order to accurately measure the traveling speed in the case wherein the vehicle is running at a much slower speed than traveling speed, then a rotational speed detection unit wherein the sensor output during one revolution of the hub changes 300 times or more is required.

Regarding the construction of the second conventional example as shown in FIGS. 26 and 27, since the sensor 6 is provided with the light emitting element and the light receiving element integrally assembled therein at the axially inner peripheral end portions, which are located on axially opposite sides of an outer peripheral rim of the tone wheel 16, the installation operation for the sensor 6 and the tone wheel 16 becomes complicated. That is to say, it is necessary to have an appropriate spacing between the sensor 6 and the tone wheel 16 so that there is no rubbing therebetween during rotation of the inner ring 5.

However, with the construction of the second example, the sensor 6 and the tone wheel 16 must be fitted at the same time to the respective outer ring 7 and the inner ring 5, making the operation of installing while maintaining an appropriate spacing difficult. Furthermore, since the positional relationship between the light emitting element and the light receiving element is fixed, the degree of freedom of design is reduced, resulting in situations wherein an optimum design for a speed sensing rolling bearing unit cannot be achieved.

Also, with the construction of the second example, from the point of view of maintaining the strength of the tone wheel 16, it becomes difficult to have a large number of apertures 19 formed in the tone wheel 16, and hence the measuring accuracy at low speed becomes a problem. That is to say, with the construction of the second example, the overall tone wheel 16 is formed from a single metal plate, which is externally secured to the inner ring 5. Consequently, as a requirement for maintaining the engagement strength, then a metal plate having a thickness of around 0.5 mm or more must be used.

However, with a metal plate of a thickness of 0.5 mm or more, as a requirement for suppressing distortion during processing, then as mentioned above, the spacing between adjacent apertures or cut-outs cannot be very narrow. If however the above operation for forming the apertures 19 is carried out by an etching process rather than a press or machining process, then the number of apertures 19 can be increased. However forming apertures by means of an etching process in a thick tone wheel 16, requires time, contributing to increased costs, and is thus undesirable.

SUMMARY OF THE INVENTION

The speed sensing rolling bearing unit according to the present invention has been developed in view of the above situation.

One object of the present invention is to provide a speed sensing rolling bearing unit comprising a rolling bearing unit having a photosensor for detecting rotation speed comprising:

a fixed ring having an end portion and a peripheral face formed with a first raceway, a rotating ring having an end portion and a peripheral face formed with a second raceway, a plurality of rolling elements rotatably provided between the first and second raceways, a cover securely mounted to the end portion of the fixed ring to sealingly prevent foreign matters from entering inside, a photosensor mounted to the cover and comprising a light-emitting element and a light-receiving element, a tone wheel securely mounted to the end portion of the rotating ring, and having a light-transmitting portion and light-blocking portion arranged circumferentially with a uniform interval for detection by the photosensor, and a seal ring for separating a portion where the sensor is provided from a portion where the rolling elements are provided.

DETAILED DESCRIPTION OF THE PREFERRED EMBODIMENTS

Figure 1:
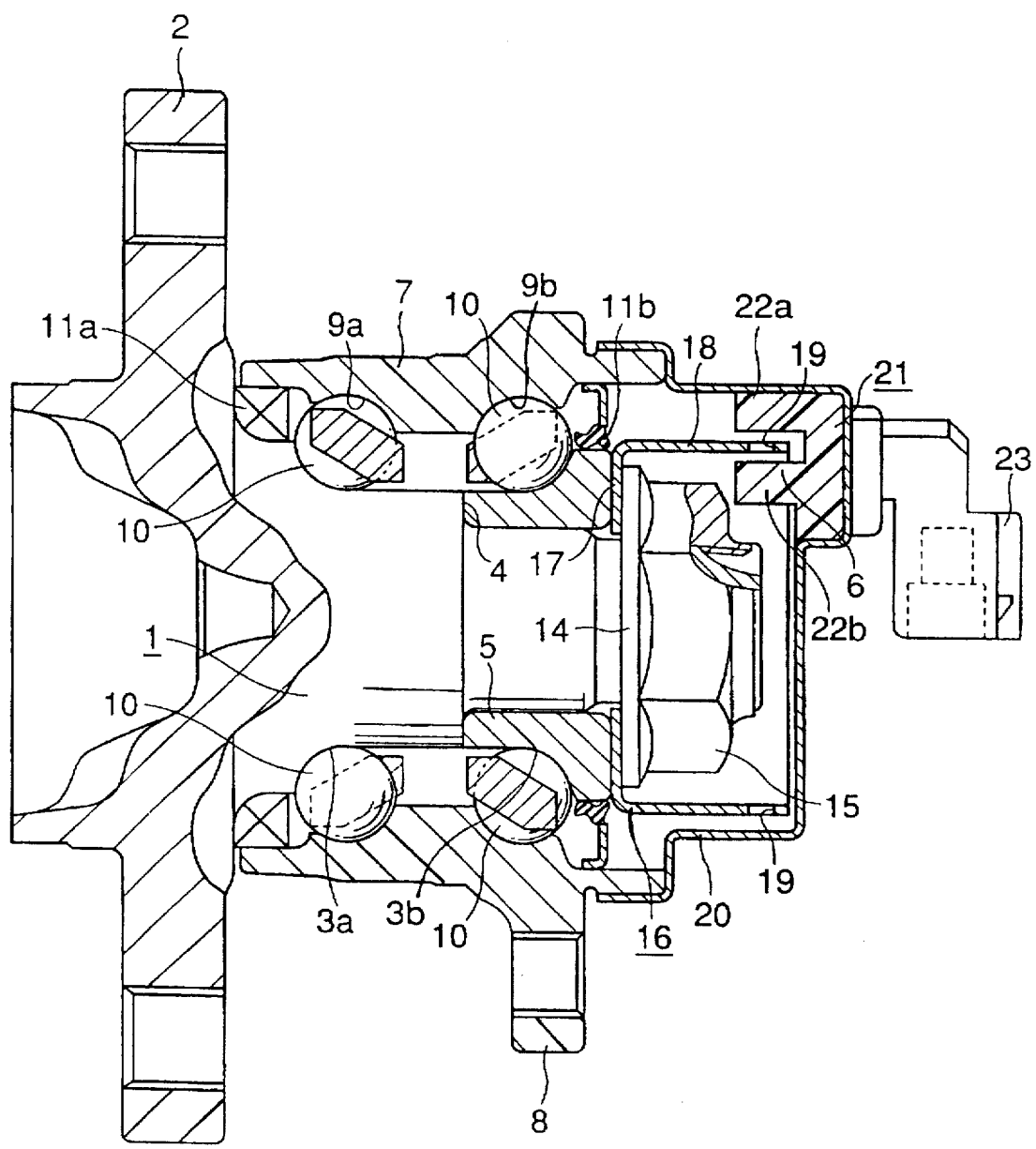
FIG. 1 is a partly taken-away, cross-sectional view showing a first embodiment of the present invention.

There are light transparent type and light reflecting type in the speed sensing rolling bearing unit utilizing light detection.

The speed sensing rolling bearing unit in the case of light transparent type arrangement according to the present invention comprises a fixed ring having a fixed race surface on a first peripheral face, a cover secured to an end portion of the fixed ring, a rotating ring having a rotating race surface on a second peripheral face faced to the first peripheral face, a plurality of rolling elements provided so as to be freely rotatable between the fixed race surface and rotating race surface, a tone wheel made in an annular shape from a light blocking or shielding material, secured to an end portion of the rotating ring, and having a plurality of light transparent portions formed at even spacing around a peripheral direction thereof, a sensor made up from a light emitter and a light receiver respectively provided at locations on either of a portion of the tone wheel with the light transparent portions therebetween, and a seal ring provided between a sensor mounting portion and a rolling-element mounting portion, which separates these two mounting portions from each other.

In the case of a reflecting type arrangement, a tone wheel is secured to an end portion of the rotating ring, and has light reflecting properties changing alternately and at even spacing around a peripheral direction thereof, while a sensor is made up with a light emitting element shining towards the tone wheel, and a light receiving element which receives the light reflected by the tone wheel.

With the speed sensing rolling bearing unit in the case of light transparent type arrangement according to the present invention constructed as described above, when the tone wheel rotates together with the rotating ring, the plurality of light transparent portions formed in the tone wheel pass between the light emitter and the light receiver of the sensor. As a result, the detection signal from the light receiver changes at a frequency proportional to the rotational speed of the rotating ring. Since the detection signal from the light receiver changes suddenly when a light transparent portion passes between the light emitter and the light receiver, and when a light blocking portion between adjacent light transparent portions passes between the light emitter and the light receiver, detection signal judgment is simple, and rotational speed detection can be reliably carried out.

Substantially the same effects are achieved in the case of the reflecting type arrangement.

The tone wheel in the transparent type arrangement may be made from any material which does not pass light, and with no particular thickness requirement. For example, when made from a metal plate such as a steel pate, then an extremely thin material of around 0.1 mm thickness can be used. Therefore, the transparent portions can be formed by a chemical process such as etching, or by laser cutting or electric discharge machining, so that it becomes possible to form extremely narrow light transparent portions with circumferential width dimensions of around 0.2 mm. Consequently, it is possible to form 300 or more light transparent portions around the peripheral direction of the tone wheel. As a result, the number of changes in the output of the sensor during one revolution of the rotating ring can be very much greater than for the case of the conventional construction, so that the traveling speed at very low speeds can be accurately measured.

Also, with the speed sensing rolling bearing unit according to the present invention, there is no requirement as with the conventional construction, for a magnetic flux to flow between the sensor and the tone wheel. Therefore, even if the spacing between the sensor and the tone wheel is made larger than 0.5 mm approximately for the conventional construction, there is no particular effect on the measurement results. Consequently, there is not requirement for especially high assembly accuracy, enabling simplification of the assembly operation.

With the speed sensing rolling bearing unit for the case wherein a reflecting type tone wheel is used, the light output from the light emitting element of the sensor is changed in direction by a half mirror of semi-transparent material before reaching the tone wheel. After this it is reflected by the surface of the tone wheel and passes back through the half mirror to reach the light receiving element. Since the reflecting properties of the surface of the tone wheel are changed alternately and at even spacing around the peripheral direction, then when the tone wheel rotates together with the rotating ring during vehicle traveling, the amount of light reflected by the surface of the tone wheel and reaching the light receiving element changes. Therefore, the detection signal from the light receiving element changes at a frequency proportional to the rotational speed of the rotating ring. Since the detection signal from the light receiving element changes suddenly corresponding to the change of the reflecting properties, then detection signal judgment is simple, and rotational speed detection can be reliably carried out.

The tone wheel and the sensor are fixed independent of each other to the fixed ring or the rotating ring. Consequently, the operation of assembling/securing the tone wheel and the sensor to the fixed ring and the rotating ring while maintaining an appropriate spacing therebetween, is simplified.

Moreover, since the tone wheel and the sensor are provided independent of each other, then the degree of freedom in locating the tone wheel and the sensor can be maintained to some degree, increasing the freedom of design, and enabling the assembly of speed sensing rolling bearing units having various constructions.

Moreover, the pitch at the surface portion of the tone wheel where the reflection characteristics change, can be made fine, enabling an improvement in rotational speed detection accuracy.

If in addition, an optical fiber cable is provided, then the freedom of locating the light emitting element, the light receiving element, and the half mirror of the sensor can be further increased, and also the entry of light as noise from the outside to the light receiving element can be avoided.

Figure 2:
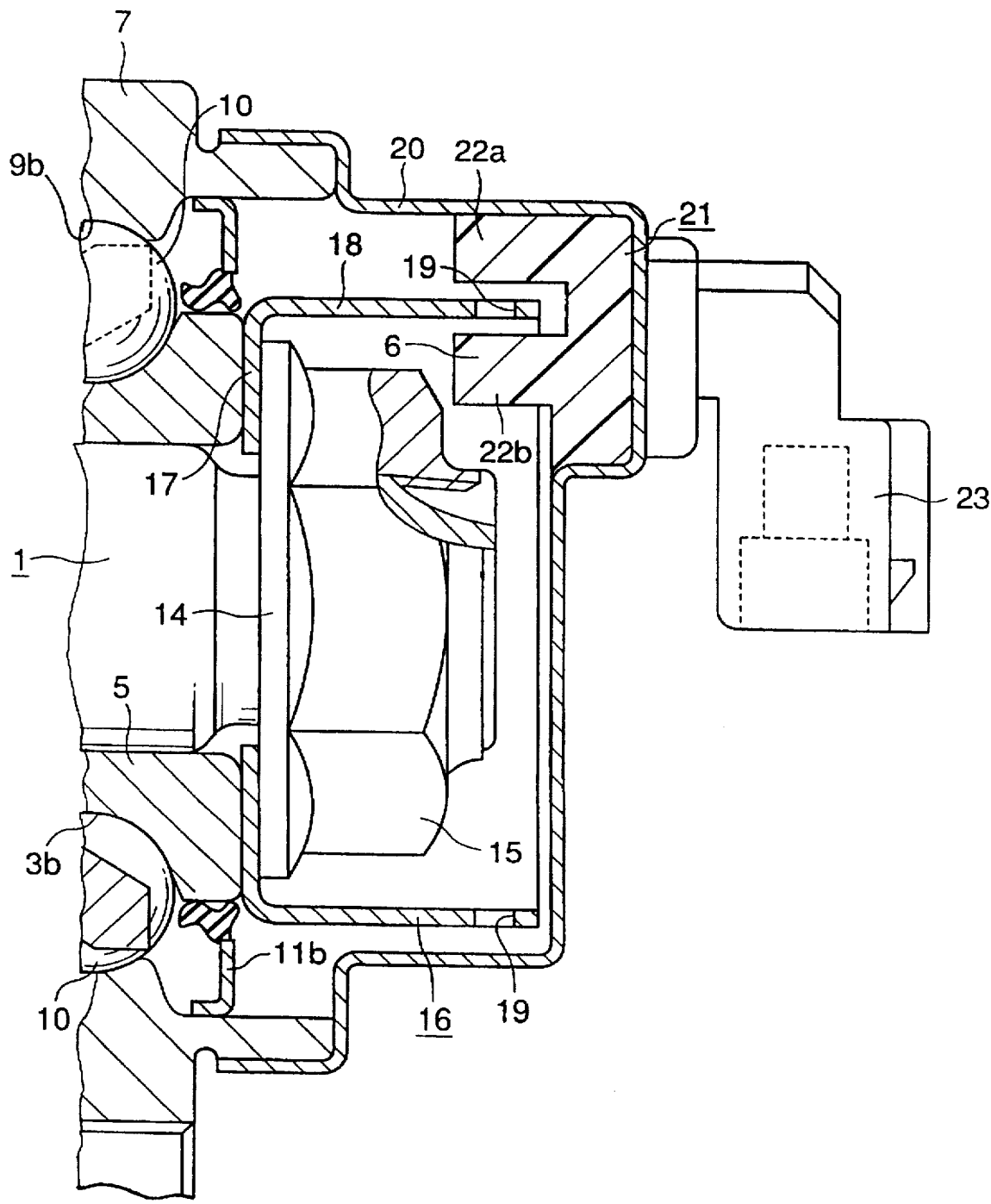
FIG. 2 is an enlarged view of a right portion of FIG. 1.

Now, FIGS. 1 and 2 show a first embodiment of the present invention. A rotating ring or hub 1 is formed with a flange 2 for wheel fixture, on an outer peripheral face of an axially outer end thereof, while an outer peripheral face of an axially central portion thereof is formed with an inner ring raceway or rotating race surface 3a and a step 4.

A rotating ring or inner ring 5 formed with an inner ring raceway or rotating race surface 3b on an outer peripheral face thereof, is externally fitted to the outer peripheral face of the hub 1, with an axially outer end face thereof abutted against the step 4.

The outer peripheral face of the central portion of the hub 1 and the outer peripheral face of the inner ring cooperate to form a second peripheral face.

There is also the case where, instead of directly forming the inner ring race 3a on the outer peripheral face of the hub 1, it is formed on another inner ring (not shown) separate from the hub 1, which is externally fitted to the hub 1 together with the inner ring 5.

A male-threaded portion 14 is formed on a portion of the hub 1 near the axially inner end thereof. The inner ring 5 is secured at a predetermined location on the outer peripheral face of the hub 1 by means of a nut 15 which is threaded onto the threaded portion 14 and tightened. A fixed ring or outer ring member 7, which is located around the hub 1, is provided with an attachment portion 8 on an outer peripheral face of an axially central portion thereof, for securing the outer ring member 7 to a suspension unit.

A first peripheral face or inner peripheral face of the outer ring member 7 is formed with respective outer ring raceways or fixed race surfaces 9a, 9b opposite to the inner ring raceways 3a, 3b.

A plurality of rolling elements 10 are respectively provided between the inner ring raceways 3a, 3b and the outer ring raceways 9a, 9b so that the hub 1 is free to rotate inside the outer ring member 7.

With the example shown in the figures, balls are used for the rolling elements 10. However in the case of a rolling bearing unit for heavy vehicles, tapered rollers may be used.

Seal rings 11a, 11b are fitted between the inner peripheral faces on the axially opposite ends of the outer ring member 7, and the respective outer peripheral faces of the hub 1 and the inner ring 5, to cover the opposite end openings of the space in which the plurality of rolling elements 10 are provided between the inner peripheral face of the outer ring member 7 and the outer peripheral faces of the hub 1 and the inner ring 5. In particular, the seal ring 11b provided between the inner peripheral face on the axially inner end of the outer ring member 7 and the outer peripheral face of the inner ring 5, prevents the ingress of grease existing in the region of rolling elements 10, into the region of a tone wheel 16 (to be described hereunder) and a synthetic resin molding 21 (to be described later) in which a sensor 6 is embedded.

A base of the tone wheel 16 is clamped between the nut 15 and an axially inner end face of the inner ring 5. The tone wheel 16 is formed in an generally annular shape of L-shape in cross section, from a thin metal plate having light blocking or shielding properties, such as a steel plate, stainless steel plate, or aluminum alloy plate. More specifically, the tone wheel 16 incorporates a disk shaped attachment base 17, and a cylindrical detection portion 18 bent axially inwards from an outer peripheral rim of the attachment base 17. The cylindrical detection portion 18 is located around the nut 15 and concentric therewith, and the attachment base 17 is clamped between the nut 15 and the axially inner end face of the inner ring 5.

Moreover, a portion on the tip end of the cylindrical detection portion 18 protruding axially inward past the inner end of the nut 15, is formed with a large number (100–300 or more) of light transparent portions 19 in the form of slits, at even spacing circumferentially therearound.

The axially inner end opening of the outer ring member 7 is covered with a cover 20 made in the form of a bottomed cylinder, by for example press forming a metal plate such as a stainless steel plate or an aluminum alloy plate.

A synthetic resin molding 21 in which is embedded a sensor 6, is fixedly retained inside the cover 20. One part of the synthetic resin molding 21 is formed into a fork shape giving a pair of protruding portions 22a, 22b. These protruding portions 22a, 22b are located on diametrically opposite sides of the tip portion of the detection portion 18 of the tone wheel 16. Embedded for example in the diametrically outer protruding portion 22a, is a light emitter such as a semiconductor laser, while embedded in the diametrically inner protruding portion 22b is a light receiver such as a photosensor.

Incidentally, the cover 20 can be comprised of a rim portion made from a metal member to be fitted to the outer ring member 7, and a bottom portion made from a synthetic resin to integrally mold the cover 20 and the sensor 6, thereby preventing the ingress of dirty water from outside.

The illuminating portion of the light emitter, and the light receiving portion of the light receiver are arranged opposite each other, with the light transparent portions 19 inserted therebetween.

A connector 23 is provided on the outside of the cover 20 for connecting power to the light emitter in the protruding portion 22a and for taking out the detection signal from the light receiver in the protruding portion 22b.

With the speed sensing rolling bearing unit according to the present invention constructed as described above, when the tone wheel 16 rotates together with the hub 1, the plurality of light transparent portions 19 formed in the detection portion 18 of the tone wheel 16 pass between the light emitter and the light receiver of the sensor 6. As a result, the detection signal from the light receiver changes at a frequency proportional to the rotational speed of the rotating ring or hub 1.

The detection signal from the light receiver changes suddenly when a light transparent portion 19 passes between the light emitter and the light receiver, and when a light blocking portion between adjacent light transparent portions 19 passes between the light emitter and the light receiver. Therefore detection signal judgment is simple, and rotational speed detection can be reliably carried out based on the detection signal sent from the light receiver. Measurement of the rotational speed based on the detection signal from the light receiver can be carried out from the number of changes in the signal per unit time (frequency), or from the period of the changes.

The tone wheel 16 may be made from any material which does not pass light, and with no particular thickness requirement. For example, when made from a metal plate such as a steel plate, then an extremely thin material of around 0.1 mm thickness can be used. Therefore, the transparent portions 19, can be formed by a chemical process such as etching, so that it becomes possible to form extremely narrow light transparent portions 19 with circumferential width dimensions of around 0.2 mm. Consequently, it is possible to form 300 or more light transparent portions 19 around the peripheral direction of the tone wheel 16.

Moreover, since the thickness is extremely small, the time required for the etching process can be shortened, and hence processing costs are not particularly high.

As a result of the large number of light transparent portions 19, the number of changes in the output of the sensor during one revolution of the hub 1 can be very much greater than for the case of the conventional construction, so that the traveling speed at very low speeds can be accurately measured.

Also, with the speed sensing rolling bearing unit according to the present invention, there is no requirement as with the conventional construction, for a magnetic flux to flow between the sensor and the tone wheel 16. Therefore, even if the spacing between the sensor and the tone wheel 16 is made larger than 0.5 mm approximately for the conventional construction, there is no particular effect on the measurement results.

Consequently, there is no requirement for especially high assembly accuracy, enabling simplification of the assembly operation.

For example, if a device used for the light emitter incorporates a semiconductor laser which can shine a very fine beam of light with practically no diffusion, then the distance of the tone wheel 16 from the light emitter and the light receiver can be large. By having this distance large, then at the time of assembly, the likelihood of the edge rim of the very thin tone wheel 16 bumping against the synthetic resin molding 21 in which the light emitter and light receiver are embedded is less likely, and the tone wheel 16 can be effectively prevented from damage.

When a cylindrical shape of tone wheel 16 is used as with the present embodiment, the cover 20 in which the sensor 6 is fixedly retained, can be engaged and secured to the fixed outer ring member 7 after fitting the tone wheel 16 to the inner ring assembly, by moving the cover 20 axially. Hence the assembly operation is simplified.

Figure 3:
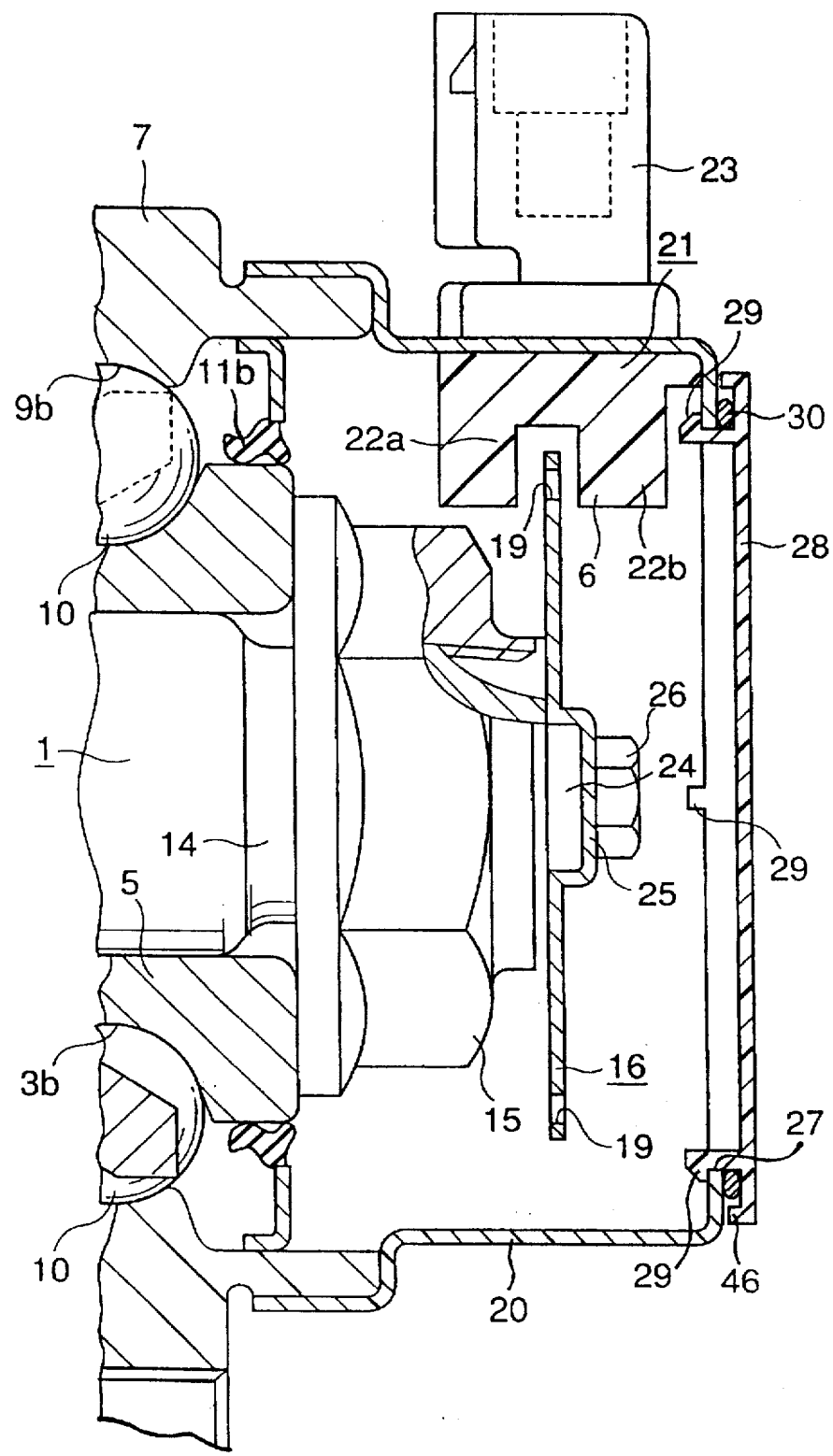
FIG. 3 is a view similar to that of FIG. 2, showing a second embodiment of the present invention.

FIG. 3 shows a second embodiment of the present invention. With this embodiment, a cylindrical protrusion 24 is formed in the axially inner end face of a hub 1. An engagement portion 25 formed on the radially central portion of a tone wheel 16, is fitted over the cylindrical protrusion 24. The tone wheel 16 is formed in a disc shape with a plurality of light transparent portions 19 formed close to the outer peripheral rim. The tone wheel 16 is secured to the axially inner end face of the hub 1 by means of a screw 26.

A cover 20 is made in a cylindrical shape with an open bottom end (right hand end in FIG. 3). A synthetic resin molding 21 in which is embedded a light emitter and a light receiver, is fixedly secured to the inner peripheral face of the cover 20.

A pair of protruding portions 22a, 22b provided in the synthetic resin molding 21, are located on the axially (left/right direction in FIG. 3) opposite sides of an outer peripheral rim portion of the tone wheel 16.

In assembling the structure of this embodiment, the cover 20 to which the synthetic resin molding 21 is secured, is engagingly secured to the outer ring member 7. Subsequently, the tone wheel 16 is inserted from the opening 27 of the cover 20 to inside the cover 20, and secured at a predetermined location. After this, the opening 27 is covered with a synthetic resin base plate 28.

Lips 29 formed at a plurality of locations on one side of the base plate 28 close to the outer periphery thereof, are engaged with the peripheral rim of the opening 27 to thereby mount the base plate 28 on the cover 20. In this condition, an O-ring 30 is clamped between a face of the cover 20 and a face of the base plate 28 to thereby seal between the cover 20 and the base plate 28. If the base plate 28 is likely to be damaged by flying stones and the like during traveling, then this can be strengthened for example by inserting a metal plate therein during formation. Provided around the base plate 28 is a cylindrical face 46 to prevent high pressure water upon car-washing from directly hitting the O-ring, and thus protecting the O-ring from breakage.

With the present embodiment, the assembly operation is more troublesome than for the first embodiment, however the manufacture of the tone wheel 16 is simpler. Moreover, with the embodiment shown in the FIG. 3, since there is not space for mounting the connector 23 on the bottom end of the cover 20, the connector 23 is mounted on the outer peripheral face of the cover 20. Consequently, components on the suspension unit (not shown) must be configured so as not to interfere with the connector 23. However, if the diameter of the tone wheel 16 is smaller than that for the embodiment shown in FIG. 3 so that the space for mounting the connector 23 on the bottom end of the cover 20 can be maintained, then the connector 23 can be mounted to the bottom end of the cover 20. Other details of the construction and operation are substantially the same as for the first embodiment.

Figure 4:
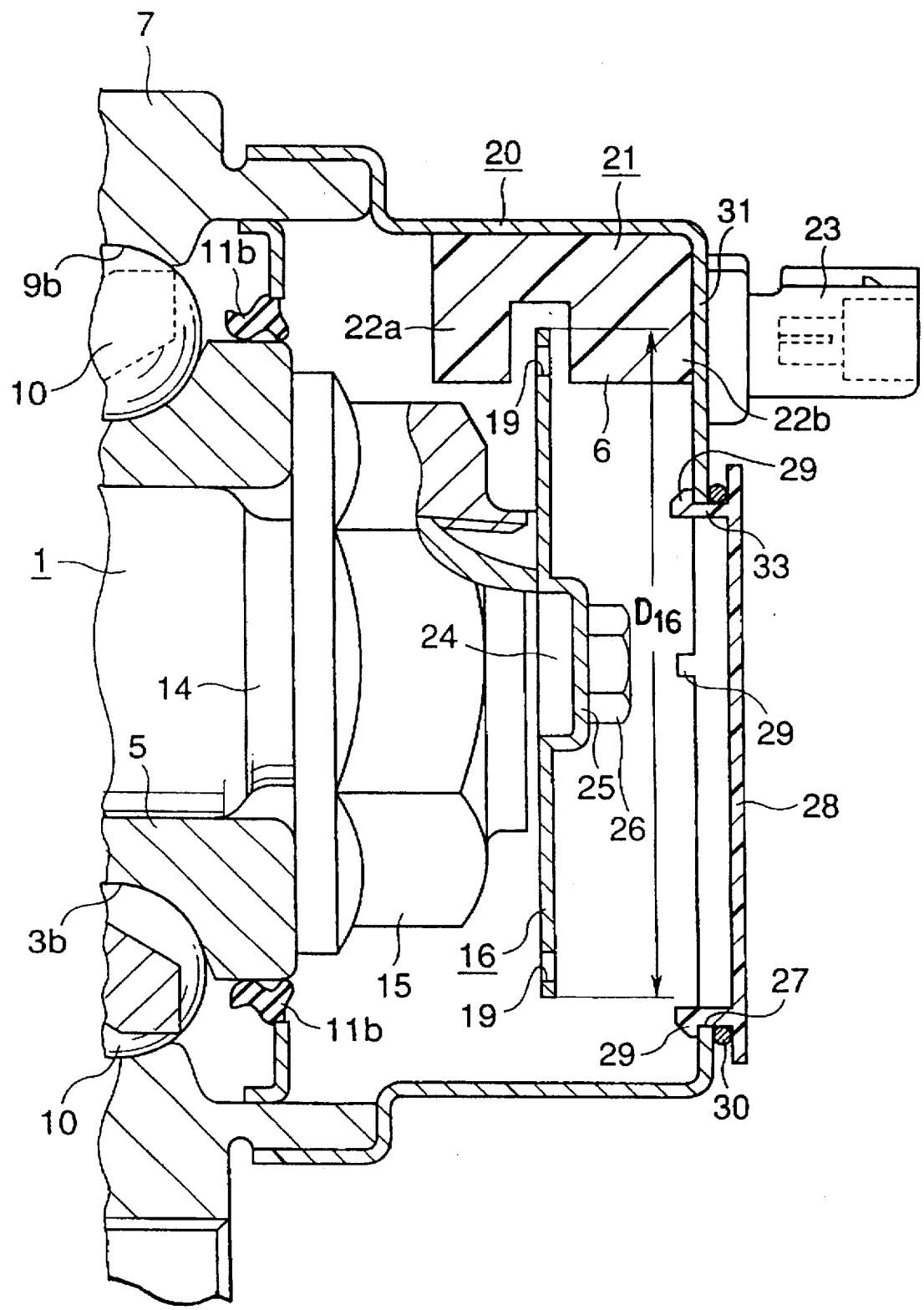
FIG. 4 is a view similar to that of FIGS. 2 and 3, showing a third embodiment of the present invention.
Figure 5:
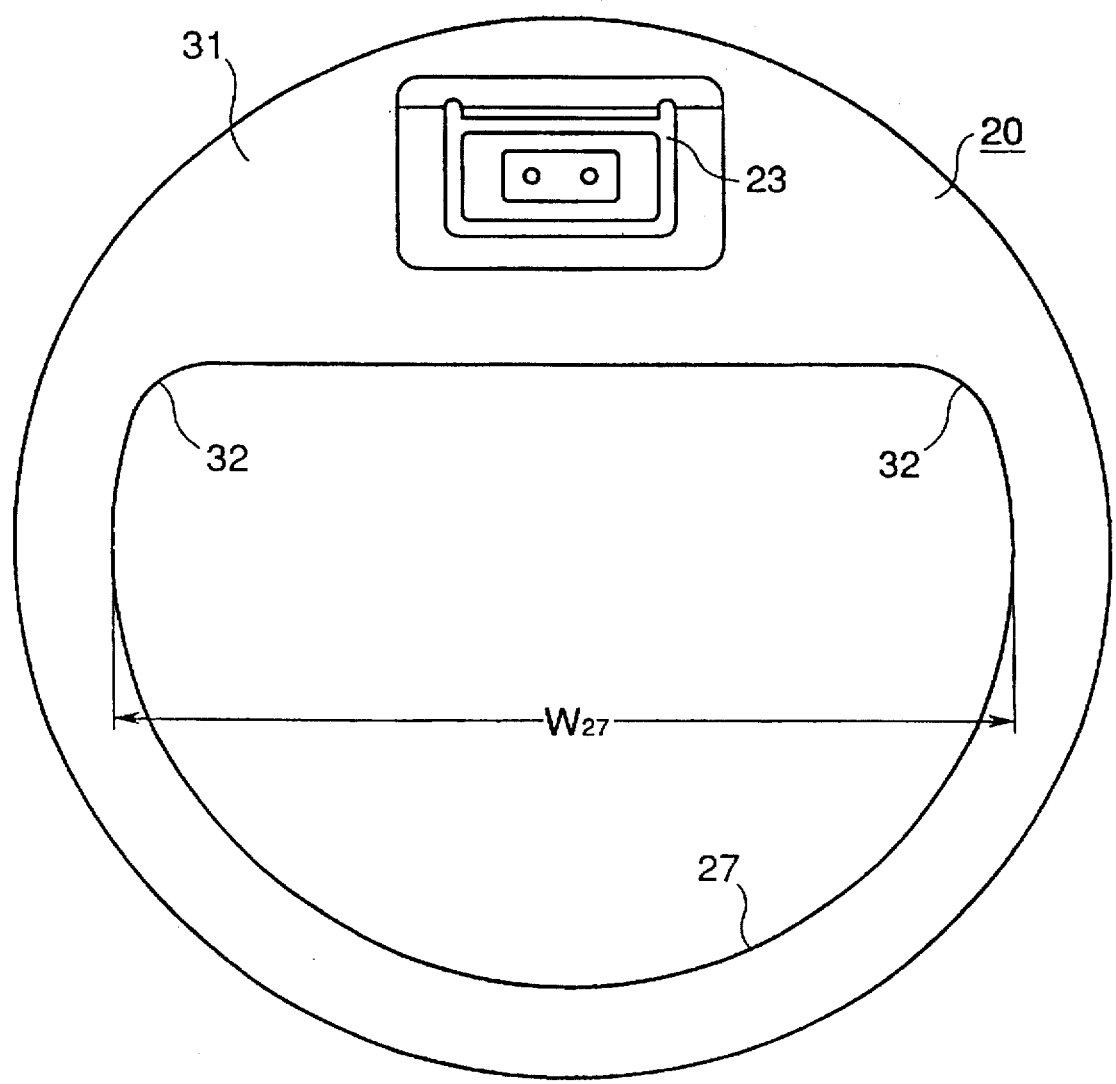
FIG. 5 is a side elevational view from the right of FIG. 4 showing a removed cover and a connector used in the third embodiment.

FIGS. 4 and 5 show a third embodiment of the present invention. With this embodiment, an opening 27 formed in a bottom plate portion 31 of a cover 20, has a segment shape slightly larger than a semicircle. The opening 27 is covered by a base plate 28 formed in a segment shape to match the opening 27. The maximum width W27 (inner diameter) of the opening 27 is made larger than the outer diameter D16 of the tone wheel 16 (W27>D16). Consequently, as with the beforementioned second embodiment, the tone wheel 16 can be secured to the inner end face of the hub 1, after the cover 20 incorporating the synthetic resin molding 21 in which the sensor 6 is embedded, has been engagingly secured to the inner end portion of the outer ring member 7.

Corner portions 32 of the opening 27 are given a relatively large radius of curvature to enable a gentle curve for an O-ring 30 externally fitted to a cylindrical portion 33 formed on one face of the base plate 28 for sealing between the bottom plate portion 31 and the base plate 28.

With the present embodiment, a connector 23 is provided on a portion of the bottom plate portion 31 separated from the opening 27. The connector 23 protrudes in the axial direction, and hence does not protrude radially. Other details of construction and operation are substantially the same as for the second embodiment.

With the present embodiment, the opening 27 in the base plate portion 31 of the cover 20 is of segment shape. However this opening can be made a circular shape larger than the outer diameter of the tone wheel 16, with the center thereof located to the radially opposite side from the connector 23, and eccentric to the axial center of the base plate portion 31 so as to obtain a space for mounting the connector 23.

Figure 6:
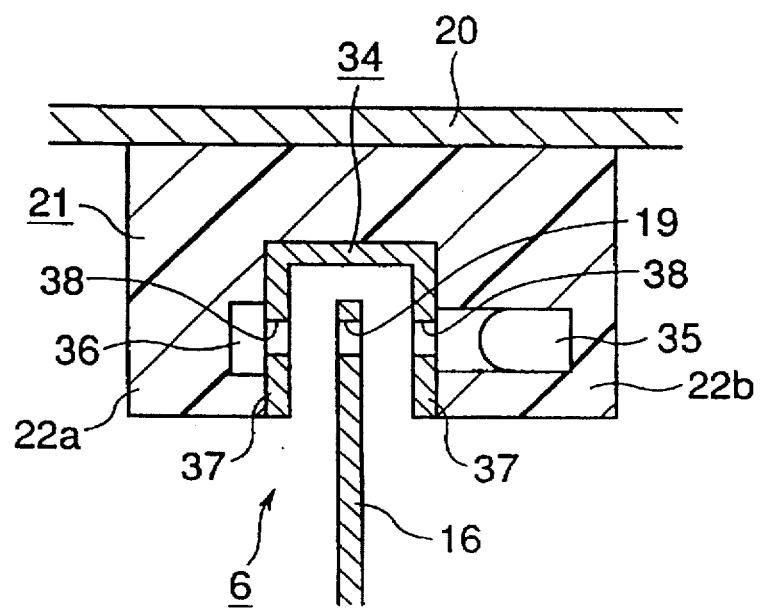
FIG. 6 is a cross-sectional view showing an example of a sensor construction.
Figure 7:
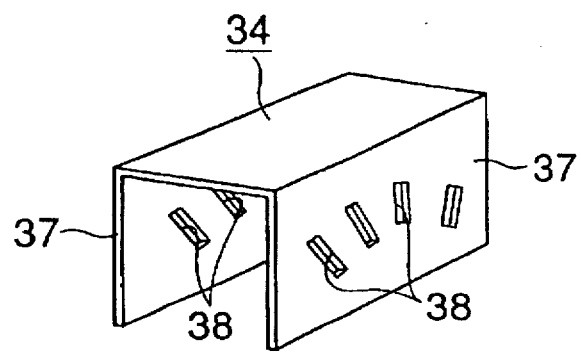
FIG. 7 is a perspective view of a light shielding plate incorporated in a sensor structure.

A light blocking or shielding plate 34 as shown in FIGS. 6, 7, may be provided between the light emitter and light receiver of the sensor 6 embedded in the synthetic resin molding 21.

In this respect, if a semiconductor laser which has practically no light diffusion is used for a light emitter 35, then even if the spacing of the light transparent portions 19 formed in the tone wheel 16 is narrow, the light reaching a light receiver 36 with rotation of the tone wheel 16 can be reliably switched on and off.

On the other hand, when a low cost light emitting diode is used for the light emitter 35, then the light diffuses. Therefore, if the spacing of the light transparent portions 19 is made narrow so that the circumferential width of the light transparent portions 19 becomes smaller than that of the light receiving portion of the light receiver 36, in a simple structure where the light emitter 35 and the light receiver 36 are opposed by way of the tone wheel 16 only, the light reaching the light receiver 36 with rotation of the tone wheel 16 can no longer be shut off. That is to say, in this condition, at least one of the light transparent portions 19 is opposed to the light receiving portion throughout rotating. In other words, there is no chance for all the light transparent portions 19 to be completely out of the facing relation with the light receiver 36 throughout rotating. Since the light from the light emitter 35 strikes the light transparent portions 19 in this condition, the output from the light receiver 36 does not change sufficiently with rotation of the tone wheel 16, so that rotational speed detection of the vehicle wheel can no longer be carried out.

On the other hand, in the structure where a light shielding plate 34 such as shown in FIGS. 6 and 7 is provided, then even if, an mentioned above, the space between the light transparent portions 19 formed in the tone wheel 16 is narrow, the light reaching the light receiver 36 can be passed and shut off completely in turn during rotation of the tone wheel 16.

This light shielding plate 34 can be made from a material which does not pass light, such as steel plate, formed into a channel shape in cross section. Furthermore, the light shielding plate 34 has a pair of mutually parallel plate portions 37 formed with respective slit shaped apertures 38 at the same pitch as the light transparent portions 19, and at mutually adjusted locations. At the time of assembling the rotational speed detection unit, these apertures 38 are positioned at locations opposite to the light transparent portions 19.

In the case wherein such a light shielding plate 34 is provided, the light output from the light emitter 35 passes through the apertures 38 formed in one of the plate portions 37 (the right one in FIG. 6), and then passes through the light transparent portions 19 formed in the tone wheel 16, and through the apertures 38 formed in the other plate portion 37 (the left hand plate portion in FIG. 6), to reach the light receiver 36. The gap between the opposite side faces of the pair of plate portions 37 and the tone wheel 16 is narrow, so that the extent of diffusion of light at this gap portion is extremely small. Consequently there is no longer the situation wherein some light is always striking the light receiving portion of the light receiver 36. The output from the light receiver 36 is thus changed sufficiently, so that rotational speed detection of the wheel can be reliably carrier out, even if a low cost light emitting diode is used for the light emitter 35.

Incidentally, it is possible, in stead of the light shielding plate 34, to arrange a pair of condenser lenses with the tone wheel portion of light transparent portions 19 positioned between them.

Figure 25:
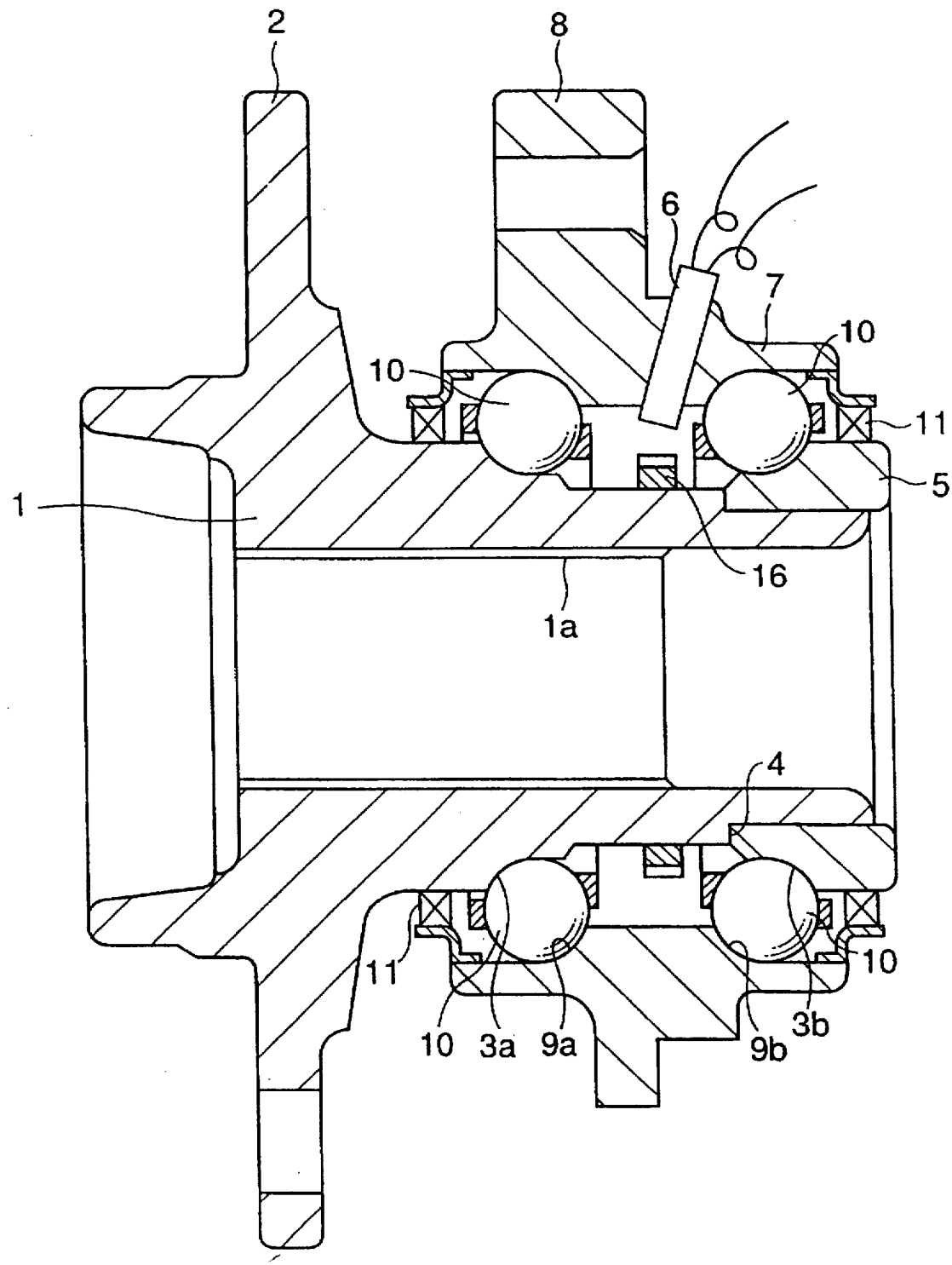
FIG. 25 is a cross-sectional view of a first example of a conventional construction.
Figure 26:
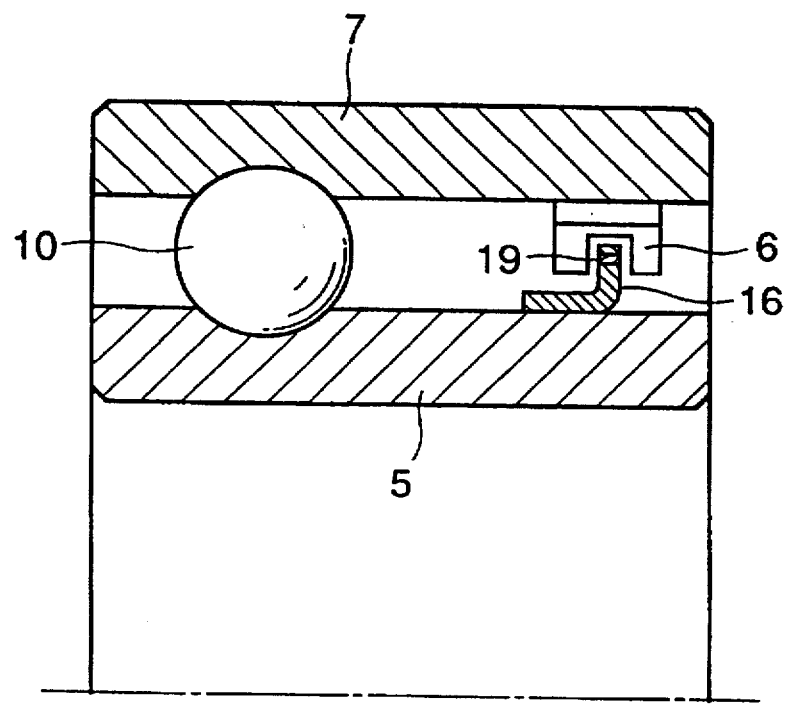
FIG. 26 is a cross-sectional view illustrating a second example of a conventional construction.
Figure 27:
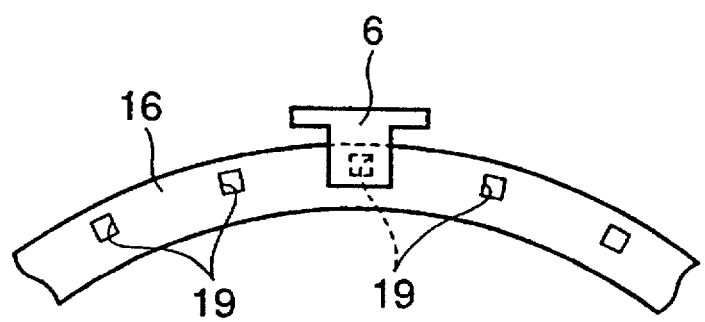
FIG. 27 is a view from the right of FIG. 26, of the tone wheel and sensor.

With the respective embodiments shown in the figures, the present invention is shown applied to a rolling bearing unit for supporting a non driven wheel (front wheel of a front-engine, rear-wheel drive vehicle, or rear-wheel of a front-engine, front-wheel drive vehicle). However the present invention can also be applied to a rolling bearing unit for supporting a driven wheel (rear wheel of a front-engine, rear-wheel drive vehicle, or front wheel of a front-engine, front-wheel drive vehicle) as shown in FIG. 25.

Moreover, the present invention can be applied to a construction wherein the inner ring is fixed and the outer ring rotates.

Furthermore, a stabilized power source circuit, and a signal treatment circuit may be fitted in the empty space inside the synthetic resin in the cover.

Figure 8:
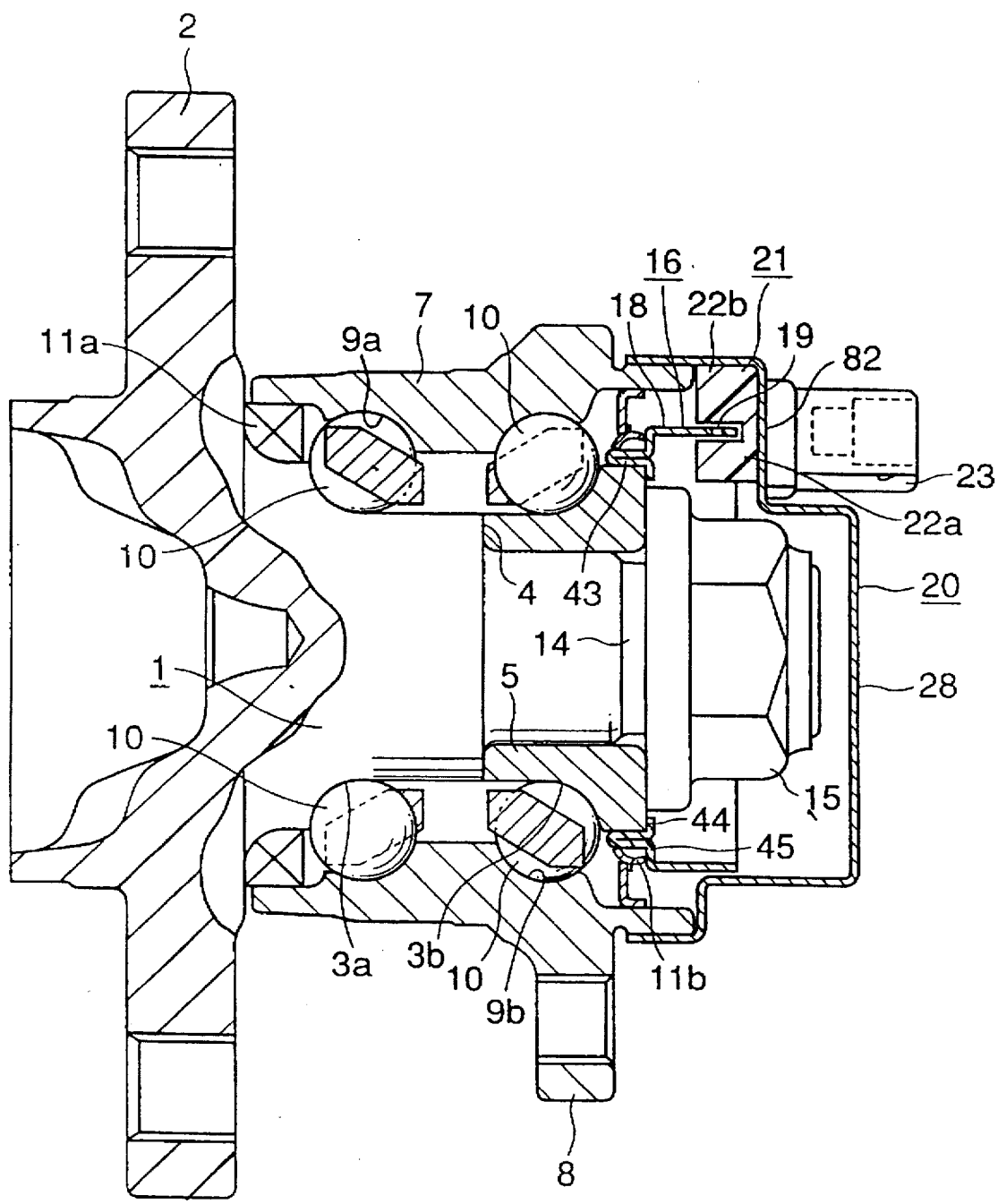
FIG. 8 is a cross-sectional view, similar to FIG. 1, showing a fourth embodiment of the present invention.
Figure 9:
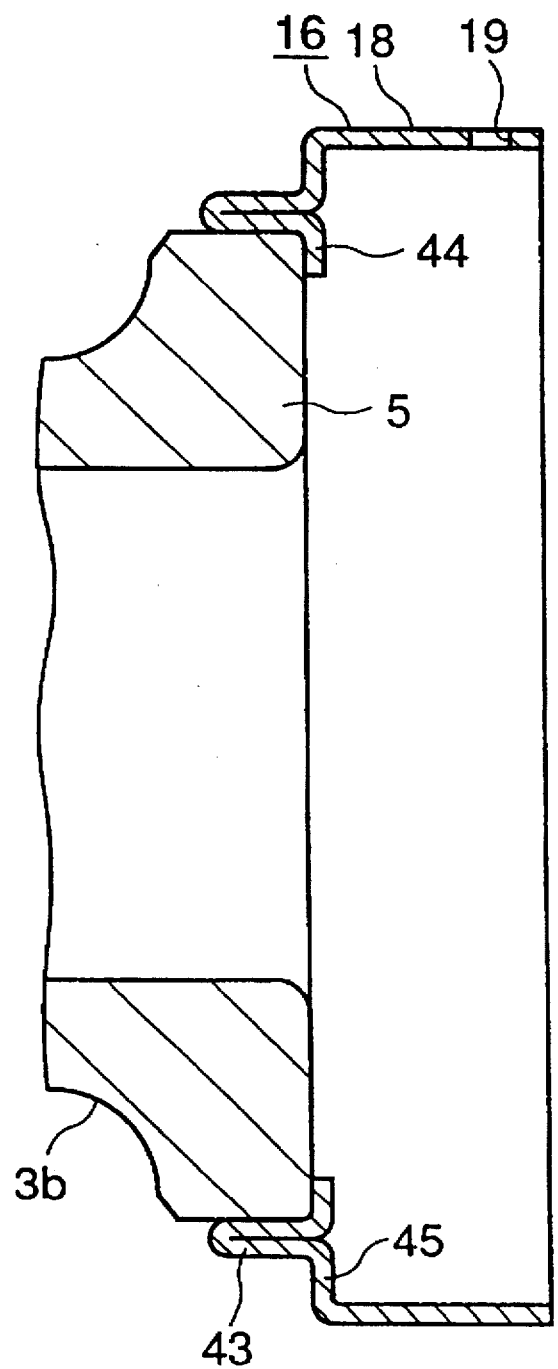
FIG. 9 is a cross-sectional view showing part of a removed inner ring and a tone wheel of FIG. 8.

FIGS. 8 and 9 show a fourth embodiment of the present invention. With this embodiment, seal rings 11a, 11b are fitted between the inner peripheral faces on the axially opposite ends of the outer ring member 7, and the respective outer peripheral faces of the hub 1 and the base end portion of the tone wheel 16 which is externally secured to the inner ring 5. These seal rings 11a, 11b cover the opposite end openings of the space in which the plurality of rolling elements 10 are provided between the inner peripheral face of the outer ring member 7 and the outer peripheral faces of the hub 1 and the inner ring 5. In particular the seal ring 11b provided between the inner peripheral face on the axially inner end of the outer ring member 7 and the outer peripheral face on the axially outer end of the tone wheel 16, prevents the ingress of grease existing in the region of rolling elements 10, into the region of the tone wheel 16 and a synthetic resin molding 21 in which a sensor 6 is embedded.

A base end of the tone wheel 16 is externally secured to an axially inner end portion of the inner ring 5. The tone wheel 16 is made in a generally annular shape for example from a thin steel plate of approximately 0.1–0.3 mm in thickness. The tone wheel 16 has a cylindrical mounting portion 43, a first bent portion 44 which is bent at right angles radially inwards from an inner end rim of the mounting rim 43, a second bent portion 45 which is bent at right angles radially outwards from the inner end rim of the mounting portion 43, and a detection portion 19 which is bent at right angles in an axially inward direction from an outer peripheral rim of the second bent portion 45. A plurality of apertures 19 (for example 100–300 or more) are formed at even spacing in a circumferential direction on a tip end portion (axially inner end portion) of the detection portion 18. The formation of the plurality of apertures 19 is carried out by an etching process. However, since the tone wheel 16 is made from a thin metal plate of a small thickness of around 0.1–0.3 mm, then the time required for the etching process is not particularly long. Consequently, the cost of manufacture of the tone wheel 16 is minimal.

The mounting portion 43 is made in a cylindrical shape with a thickness twice that of the thin metal plate, by bending the thin metal plate fully back through 180 degrees. The mounting portion 43 is externally engaged with the axially inner end portion of the inner ring 5 to thereby secure the tone wheel 16 to the inner ring 5. With the mounting portion 43 externally fitted in this way to the axially inner end portion of the inner ring 5, the first bent portion 44 is abutted against the axially inner end face of the inner ring 5. Consequently the location of the tone wheel 16 relative to the inner ring 5 is readily controlled. Moreover, the second bent portion 45 connecting between the mounting portion 43 and the detection portion 18 is arranged coplanar with the first bent portion 44.

With the tone wheel 16 as described above, the cylindrical mounting portion 43 is secured by externally fitting to the axially inner end portion of the inner ring 5. However, since the mounting portion 43 is formed by bending back the thin metal plate through 180 degrees, it has sufficient strength. Therefore even when the tone wheel 16 is made from a thin material of around 0.1–0.3 mm, the engagement strength of the tone wheel 16 with respect to the inner ring 5 can be sufficiently maintained.

Moreover, at the time of engagingly securing the mounting portion 43 to the inner ring 5, the tone wheel 16 must be pressed in the axial direction. However, this pressing operation can be easily carried out by abutting the end face of a press tool (not shown in the figure) against the inside faces of the coplanar first and second bent portions 44, 45. Other details of the construction and operation are the substantially same as for the first embodiment.

Figure 10:
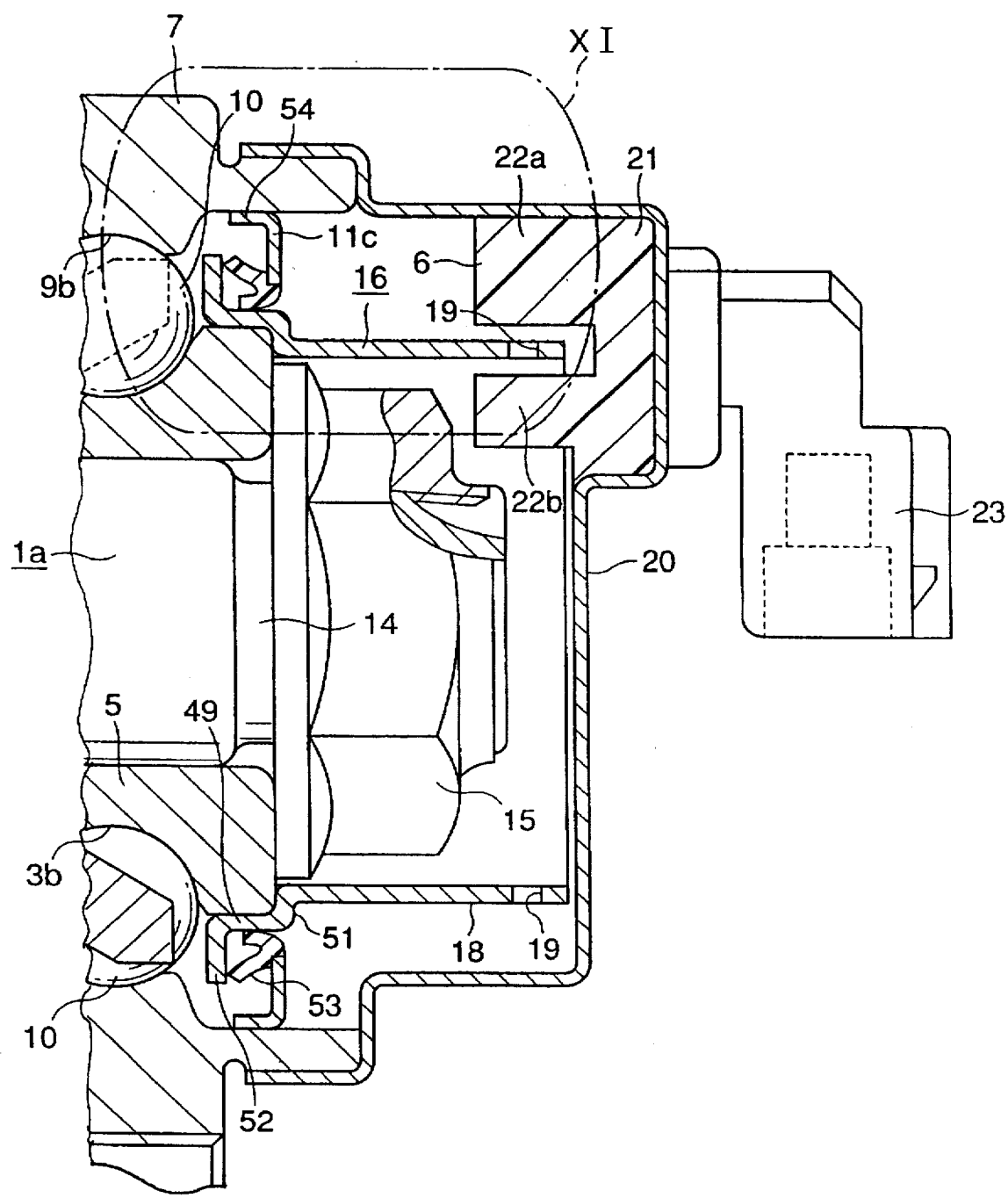
FIG. 10 is a cross-sectional view, similar to FIG. 2, showing a fifth embodiment of the present invention.

FIG. 10 shows a fifth embodiment of the present invention. The embodiment is an example of where a high performance seal is fitted so as to reliably prevent grease from floating out from the bearing portion and into the sensor portion.

In this embodiment, the shapes of the tone wheel 16 and the seal ring 11c are tailored to more positively prevent the grease contained in the section where the rolling elements 10 are installed, from entering the section of the synthetic resin 21 where the tone wheel 16 and the sensor 6 are embedded.

The tone wheel 16 is made from a light shielding material in a generally annular or cylindrical shape, and comprised of a first cylindrical portion 49, a second cylindrical portion or detection portion 18 provided concentric with and smaller in diameter than the first cylindrical portion 49, a step portion 51 for connecting the base and edge (left end edge in FIG. 10) of the second cylindrical portion or detection portion 18 to the tip end edge (right end edge in FIG. 10) of the first cylindrical portion 49, and a flange portion 52 extending from the base end edge of the first cylindrical portion 49 radially outwards.

The second cylindrical portion or detection portion 18 corresponds to the cylindrical detection portion 18 of the first embodiment; and is provided with a plurality of light transparent portions 19 arranged circumferentially with a uniform spacing. The light transparent portions 19 are formed in a slit shape, respectively.

The first cylindrical portion 39 is fitted onto the second peripheral face or the outer peripheral face of the axially inner end of the inner ring 5 so as to fixedly support the tone wheel 16 with the inner ring 5.

In this state, the axially outer face (left face in FIG. 10) of the step portion 51 is abutted to the axially inner end face (right face in FIG. 10) of the inner ring 5. Specifically, the step portion 51 serves as a face to which the press tool is abutted so as to securely support the tone wheel 16 with the inner ring 5, and as a stopper for positioning.

The seal ring 11c is comprised of a generally annular core member 54 having a L-shaped cross section, and a seal lip 53 made from an elastic material and provided generally along the inner peripheral edge of the core member 54.

The seal lip 53 is slidingly engaged with the outer peripheral face of the first cylindrical portion 49 and with the axially inner face (right face in FIG. 10) of the flange portion 52.

The core member 54 is securely fitted into the first peripheral face or inner peripheral face of the axially inner end of the outer ring member 7.

The seal lip 53 is formed in a fork-like shaped as shown in FIG. 10. The fork-like shape portion of the seal lip 53 have their tip-end slidingly engaged with the outer peripheral face of the first cylindrical portion 49 and the axially inner face of the flange portion 52.

The radially outer tip end of the flange portion 52 is placed closer to the inner peripheral face of the core member 54, so that a kind of labyrinth seal is formed between the outer peripheral face of the flange portion 52 and the inner peripheral face of the core member 54.

Accordingly, the grease contained in the section where the rolling elements are installed is more positively prevented from entering into the section of the synthetic resin 21 in which the tone wheel 16 and the sensor 16 are embedded.

Specifically, the grease must pass through the labyrinth seal and change its flow direction and pass through the sliding portions between one of the tip ends of the seal lip 53 and the outer peripheral face of the first cylindrical portion 49 and between the other of the tip ends of the seal lip 53 and the axially inner face of the flange portion 52 before the grease reach the section of the synthetic resin 21.

The grease can hardly pass all of the portions, and the therefore the leakage of grease is securely prevented.

When assembling the structure in this embodiment, first the tone wheel 16 is mounted to the inner ring 5, and then the seal ring 11c is fitted into the outer ring member 7. After that, the cover 20 is securely fitted to the outer ring member 7. The other structures and operations including the cover 20 are substantially the same to those of the first embodiment.

Figure 11:
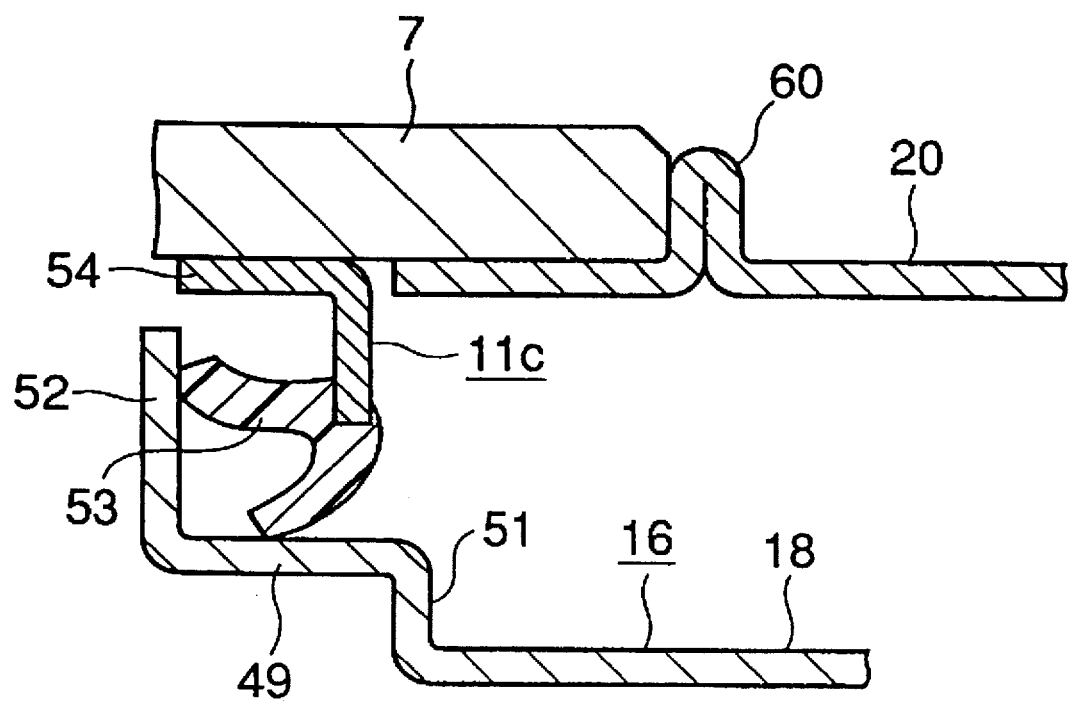
FIG. 11 is a partial cross-sectional view of the portion XI of FIG. 10, illustrating a sixth embodiment of the present invention.

FIG. 11 shows an eighth embodiment of the present invention. This embodiment differs from that of FIG. 10 in that the cover 20 is pressingly secured into the axially inner end face of the outer ring member 7, although the cover 20 is fitted over the outer ring member 7 in the embodiment of FIG. 10. Since the axial length of the axially inner end of the outer ring member 7 is sufficiently secured in this embodiment of FIG. 11, the cover 20 is securely fitted into the outer ring member 7. A folded type of flanged protrusion 60 is formed in the axially outer end portion of the cover 20 so as to serve as a stopper upon mounting the cover 20 to the outer ring member 7.

Figure 12:
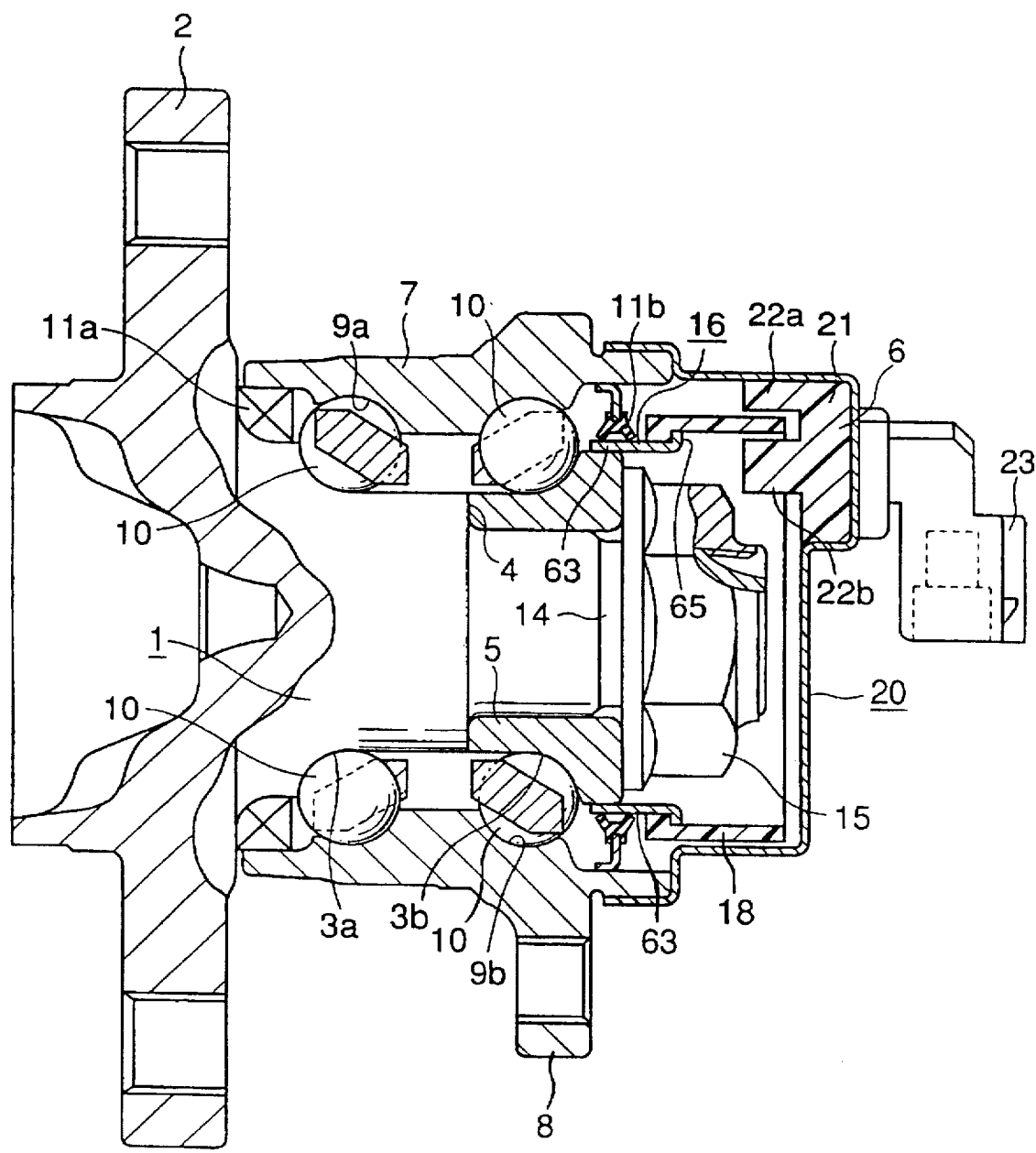
FIG. 12 is a cross-sectional view showing a seventh embodiment of the present invention.

FIG. 12 shows a ninth embodiment of the present invention. The tone wheel 16 of this embodiment comprises an attachment base 63 having sufficient engagement strength, and a detection portion 18 of a photosensitive resin.

The base portion of the tone wheel 16 is externally secured to the axially inner end portion of the inner ring 5. The tone wheel 16 is made by joining together in the axial direction (left right direction in FIG. 12), an annular of cylindrical attachment base 63 made from a metal plate such as steel, and an annular or cylindrical detection portion 18 made from a photosensitive resin. In order to maintain sufficient engagement strength of the attachment base 63 with respect to the inner ring 5, the attachment base 63 is made from a metal plate having sufficient thickness (for example around 0.5 mm). Moreover, a brim 65 which is bent radially outwards, is formed on the inner end portion of the attachment base 63. An inner peripheral face of an axially outer end portion of the detection portion 18 is engaged with the brim 65 to thereby engagingly secure the detection portion 18 to the attachment base 63. The inner ring peripheral rim of the seal ring 11b rubs against the outer peripheral face of the base end of the attachment base 63.

The attachment base 63 and the detection portion 18 of the tone wheel 16, are fixedly joined to each other by placing the attachment base 63 in an injection mold at the time of injection molding the detection portion 18 from photosensitive resin. In the joined condition, a portion on the axially inner end face of the brim 65 is exposed from the covering of the detection portion 18. Therefore when the outer half of the attachment base 63 is externally secured to the inner ring 5, the end face of a press tool (not shown) can be abutted against the axially inner face of the brim 65. Consequently the operation of externally securing the tone wheel 16 to the inner end portion of the inner ring 5 can be easily carried out without damage to the photosensitive resin detection portion 18.

A plurality of light transparent portions (for example 100-300 or more, not shown) are formed in the photosensitive resin detection portion 18, at an even pitch around the circumferential direction. More specifically, light transparent and non transparent portions are alternately formed in the detection portion 18 at even spacing around the circumferential direction, by optical treatment of the photosensitive resin of the detection portion 18.

For the photosensitive resin, a conventional type resin can be used. For example one used for making printed circuit boards, or one used in the printing field that is hardened by ultraviolet rays. In any case, the pitch of the light transparent portion can be made very fine irrespective of the thickness of the attachment base 63 required to maintain the engagement strength with the inner ring 5. Rotational speed detection accuracy at low speeds can therefore be sufficiently high. Other details of the construction and operation are substantially the same as for the beforementioned first embodiment.

Figure 13:
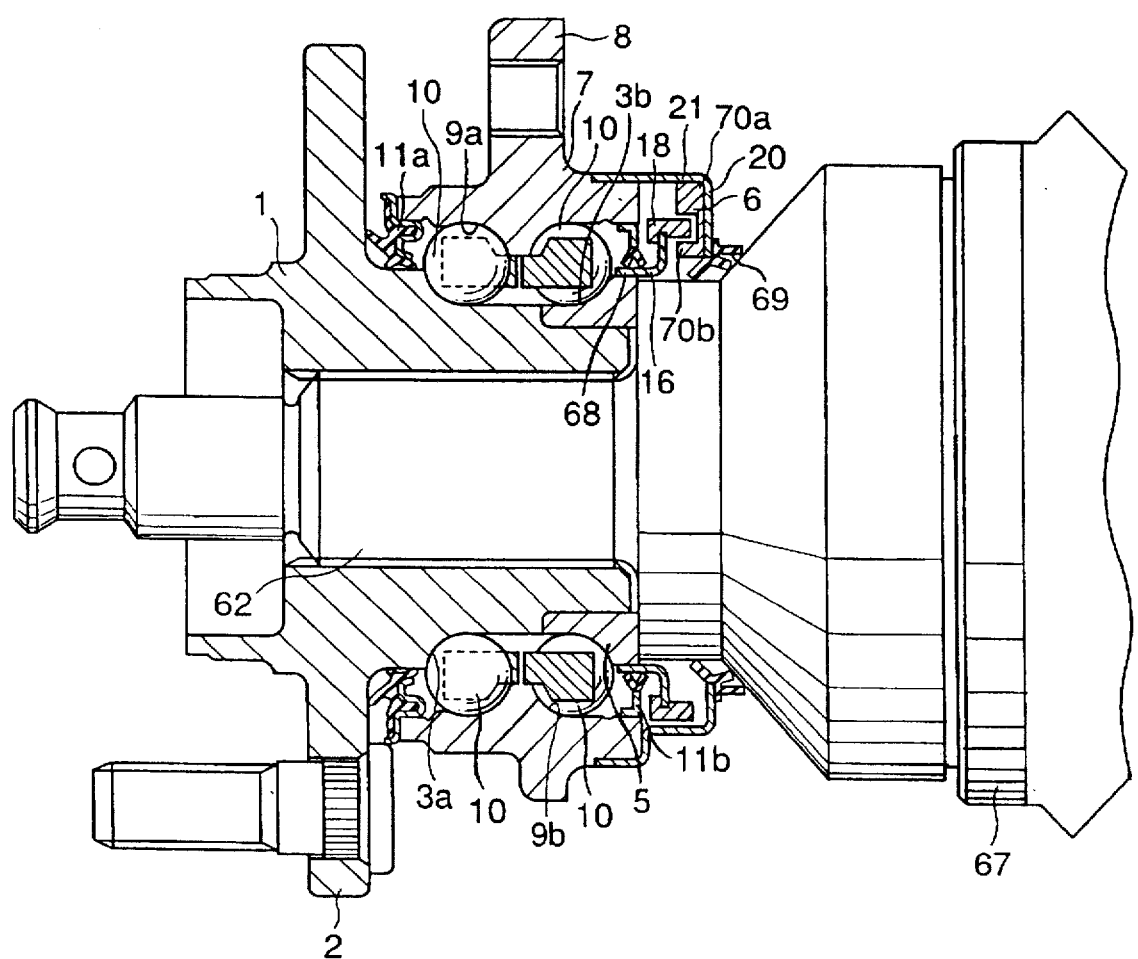
FIG. 13 is a cross-sectional view showing an eighth embodiment of the present invention.

FIG. 13 shows an eighth embodiment of the present invention. With the beforementioned sixth embodiment, the present invention was shown applied to a rolling bearing unit for supporting a non driven wheel (front-wheel of front-engine, rear-wheel drive vehicle or rear-wheel of a front-engine, front-wheel drive vehicle). With this embodiment however the invention is shown applied to a rolling bearing unit for supporting a driven wheel (rear-wheel of a front-engine, rear-wheel drive vehicle, or front-wheel of a front-engine, front-wheel drive vehicle).

Therefore with this embodiment, a hollow cylindrical member is used for the hub 1, as with the first example of the conventional construction. The inner peripheral face of the hub 1 is engaged by means of a spline, with the outer peripheral face of a drive shaft 62 which is driven by a constant velocity joint 67. An annular cover 20 is externally secured to the axially inner end portion of the outer ring member 7. An inner peripheral edge of a seal lip 69 which is engaged with the inner peripheral rim of the cover 20, rubs against an outer peripheral face of the constant velocity joint 67 to thereby seal between the cover 20 and the constant velocity joint 67.

A tone wheel 16 comprising an attachment base 68 and a detection portion 18, is externally secured to the inner end portion of the inner ring 5. The attachment base 68 is made in generally annular shape of L-shape in cross section, from a metal plate having a thickness so as to maintain sufficient engagement strength. The detection portion 18 is engagingly secured to the diametrical outside of the attachment base 68 by the engagement of an outer peripheral rim portion of the attachment base 68 in an engagement groove formed on an inner peripheral rim portion of the detection portion 18. This jointing is carried out at the same time as the injection molding of the detection portion 18.

A sensor 6 secured to the cover 20, has a pair of protrusions 70a, 70b separated in the radial direction of the cover 20. An inner end of the detection portion 18 is inserted between the pair of protrusions 70a, 70b. A plurality of light transparent portions (not shown) are formed on the axially inner end portion of the detection portion 18 as with the first embodiment, at even spacing around the circumferential direction.

Details of the construction and operation are substantially the same as for the first embodiment. The present invention can also be embodied in a rolling bearing unit wherein the inner ring is fixed and the outer ring rotates.

Figure 14:
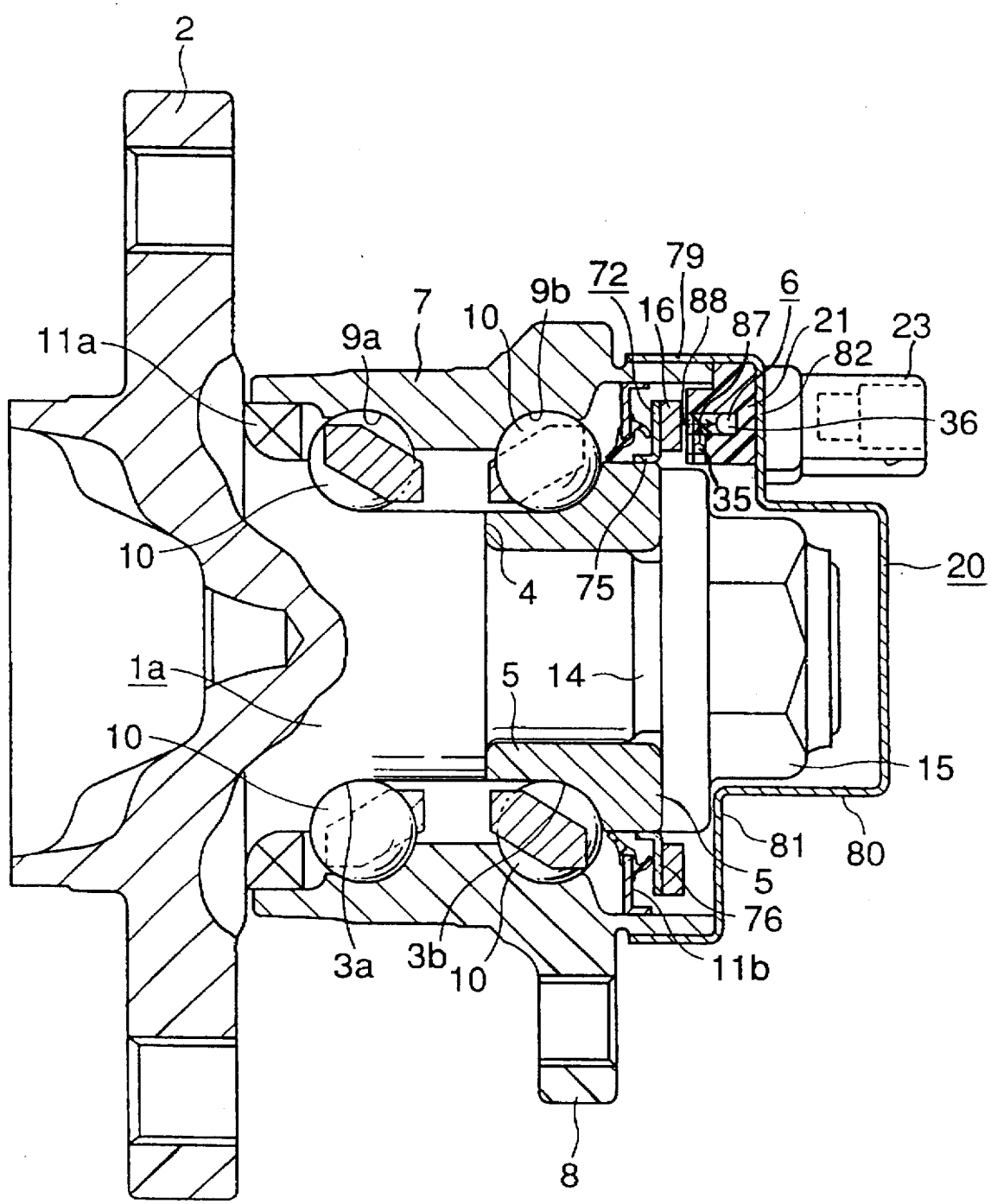
FIG. 14 is a cross-sectional view showing a ninth embodiment of the present invention.
Figure 15:
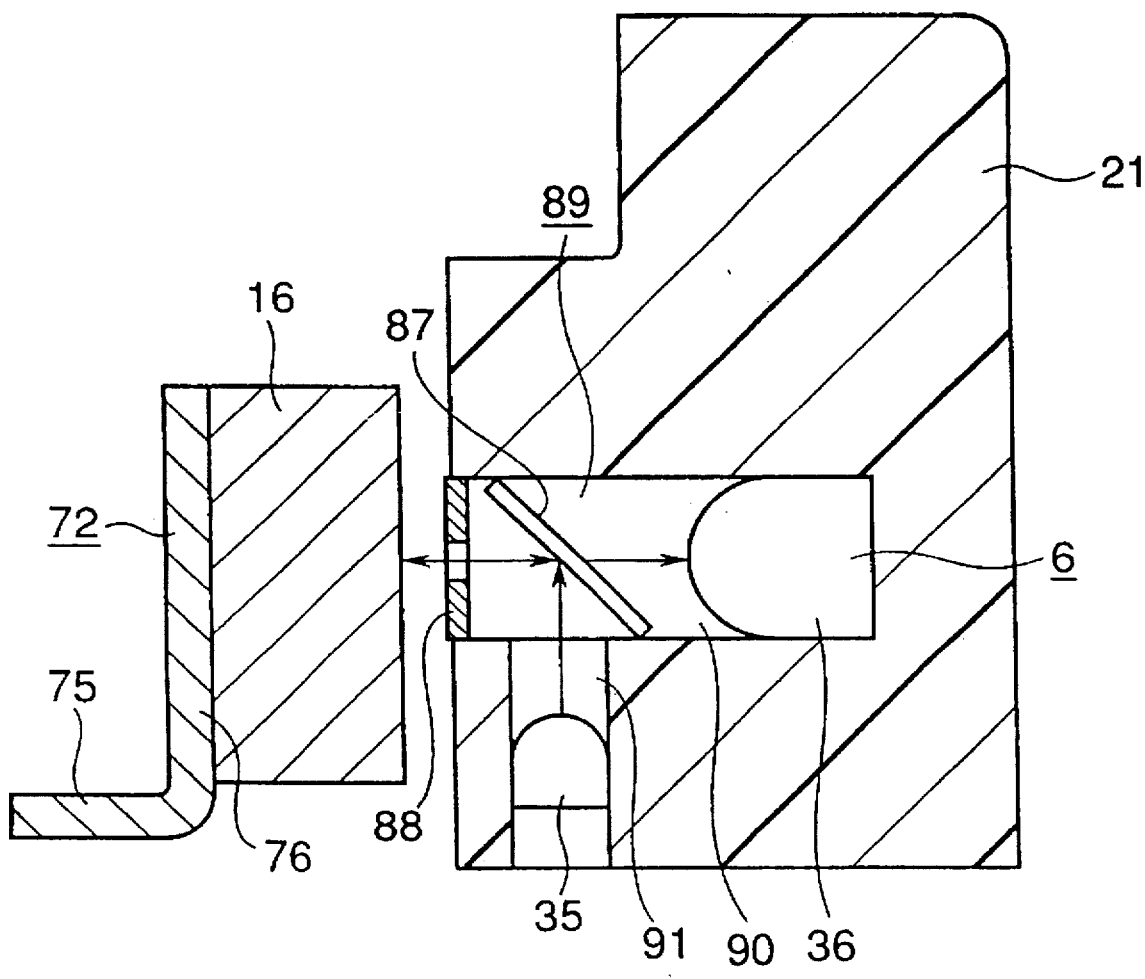
FIG. 15 is an enlarged cross-sectional view showing a removed tone wheel and sensor.

FIG. 14 and 15 show a ninth embodiment of the present invention. This embodiment is an example of the case wherein a reflecting type tone wheel is used.

A retaining ring 72 is externally secured to the axially inner end portion of the inner ring 5, and a tone wheel 16 made in an annular shape from a synthetic resin and the like, is supportingly secured to an axially inner face of the retaining ring 72.

The retaining ring 72 is made in generally annular shape of L-shape in cross section from a metal plate having sufficient rigidity. A cylindrical portion 75 of the retaining ring 72 is externally fitted to the axially inner end portion of the axially inner ring 5, and the tone wheel 16 is secured by an adhesive and the like to the axially inner face of a disk portion 76 of the retaining ring 72. The reflecting properties of the inner face of the tone wheel 16 are changed alternately in the circumferential direction and at even spacing.

Various methods may be considered for alternately changing the reflecting properties in this way. For example the following methods 1–4 may be used:

(1) Making the tone wheel 16 from a material having a low reflectivity, and intermittently forming portions having high reflectivity, by for example metal plating the axially inner face of the tone wheel 16 at a large number of locations around the circumferential direction.

(2) Making the tone wheel 16 from a material such as stainless steel plate having a high reflectivity, and intermittently forming portions having low reflectivity, by for example coating a black mat coating on the axially inner face of the tone wheel 16 at a large number of locations around the circumferential direction.

(3) Successively forming on the axially inner face of the tone wheel 16 of any material at a large number of locations around the circumferential direction, alternate portions of high reflectivity such as with (1), and of low reflectivity such as with (2).

Figure 18A:
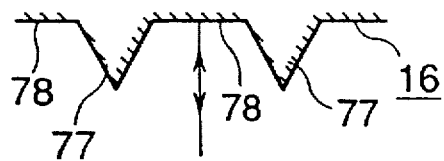
FIGS. 18A and 18B are an enlarged component cross-sectional schematic view showing a construction wherein reflecting properties are changed by changing the form of the tone wheel surface.
Figure 18B:
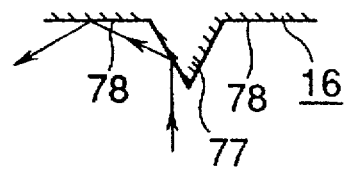

(4) Making the tone wheel 16 from a material having a high reflectivity such as stainless steel plate or a high function resin of a bright color such as white, and as shown in FIGS. 18(A) and 18(B), intermittently forming on the inner face of the tone wheel 16 at a large number of locations around the circumferential direction, radially long prism-shaped protrusions 77.

As shown in FIG. 18(A) light impinging on a flat portion 78 between adjacent protrusions 77 is reflected back in the direction of the transmission, however as shown in FIG. 18(B), light impinging on the protrusions 77 is reflected to the side, and does not return back in the direction of transmission.

The thickness of the tone wheel 16 need not be as large as that shown in FIG. 14.

Moreover, by alternately changing the reflecting properties of the axially inner face of the axially inner ring 76 of the retaining ring 72 around the circumferential direction, the retaining ring 72 can also be made to function as the tone wheel 16.

A cover 20, made for example by deep-drawing a metal plate, is externally secured to the axially inner end opening of the outer ring member 7. With the embodiment shown in FIG. 14, the cover 20 comprises a large diameter portion 79 on the opening side, and a small diameter portion 80 on the bottom side (right hand side in FIG. 14). The tip half of the nut 15 is inserted inside the small diameter portion 80. A part of a step portion 81 connecting between the large diameter portion 79 and the small diameter portion 80, is protruded slightly inwards to serve as a sector shaped (as seen from the right in FIG. 14) attachment portion 82. Furthermore, a synthetic resin molding 21 in which a sensor 6 is embedded, is provided inside the attachment portion 82. An aperture is provided in a portion of the attachment portion 82, through which the synthetic resins constituting the synthetic resin molding 21 and a connector 23 are bonded together.

The sensor 6 comprises a light emitting element 35 such as a semiconductor laser or a light emitting diode, a light receiving element 36 such as a phototransistor, a half mirror or semi-transparent mirror 87, and a slit plate 88.

For the light emitting diode, an infrared light emitting diode may be used.

The sensor 6 made as mentioned above is set inside a cavity 89 formed in the synthetic resin 21. The cavity 89 comprises a main aperture 90 formed perpendicular to the inner face of the tone wheel 16, and a branch aperture 91 branching perpendicularly to the side from an intermediate portion of the main aperture 90.

The light receiving element 36 is secured to a bottom end of the main aperture 90, while a light emitting element 35 is secured to an intermediate portion of the branch aperture 91, with the respective light axes coinciding with the axes of the apertures 90, 91.

The half mirror 87 is secured to an intermediate portion of the main aperture 90 at a portion opposite to the opening of the branch aperture 91, and inclined at an angle of 45 degrees to the axes of the apertures 90, 91. The slit plate 88 is secured to the opening of the main aperture 90 so as to face the inner face of the tone wheel 16. A lead for power to the light emitting element 35 and a lead for taking out the signal from the light receiving element 36, are passed through an aperture formed in the attachment portion 82.

Due to the above construction for the sensor 6, light shining from the light emitting element 35 is reflected by the half mirror 87 and passes on to the axially inner face of the tone wheel 16. Moreover, light reflected by the axially inner face of the tone wheel 16 passes through the half mirror 87 and on to the light receiving element 36.

A plurality of slits (for example 2 or 3) are formed in the slit plate 88 at the same pitch as the reflecting portion formed on the axially inner face of the tone wheel 16. Such a slit plate 88 is provided so as to prevent the situation wherein the light shining from the light emitting element 35 via the half mirror 87 towards the tone wheel 16 diffuses, so that light always passes to the light receiving element 36 irrespective of rotation of the tone wheel 16.

Consequently, if a semiconductor laser which has practically no light diffusion is used for the light emitting element 35, such a slit plate 88 can be omitted. Moreover, the light emitting element 35 and the light receiving element 36 can be positioned in an opposite arrangement to that of the embodiment shown in the figure.

With the speed sensing rolling bearing unit according to the present invention constructed as described above, the light output from the light emitting element 35 of the sensor 6 is changed in direction through 90 degrees by the half mirror 87, before reaching the axially inner face of the tone wheel 16.

Then, the light reflected by the inner face passes back through the half mirror 87 to reach the light receiving element 36.

When the tone wheel 16 rotates together with the hub 1 during vehicle traveling, the amount of light reflected by the axially inner face of the tone wheel 16 and reaching the light receiving element 36 changes. Therefore, the detection signal from the light receiving element 36 changes at a frequency proportional to the rotational speed of the hub 1. The detection signal from the light receiving element 36 changes suddenly when the light shining from the light emitting element 35 reaches the portion of high reflectivity on the axially inner face of the tone wheel 16, and when it reaches the portion of low reflectivity. As a result, detection signal judgment is simple, and rotational speed detection can be reliably carried out.

The sensor 6 is retained as an integral body inside the synthetic resin molding 21 which is supported in the cover 20. By externally fitting the cover 20 to the axially inner end portion of the outer ring member 7 after the tone wheel 16 is externally secured to the inner ring 5, simple installation is possible. Consequently, the operation of assembling/ securing the sensor 6 to the outer ring member 7 while maintaining an appropriate spacing between the sensor 6 and the tone wheel 16, is simplified.

Moreover, the degree of freedom in locating the sensor 6 and the tone wheel 16 can be maintained to some extent, increasing the degree of freedom of design, and enabling the assembly of speed sensing rolling bearing units having various constructions.

For example in the case of the present embodiment, by arranging the sensor 6 and the tone wheel 16 axially opposite to each other, then the diametric dimension of the rotational speed detection unit is reduced.

On the other hand, if for example at least one part of the tone wheel 16 is made into a cylindrical portion, and the reflecting properties of the peripheral face of the cylindrical portion are changed alternately around the circumferential direction, then the sensor can be arranged opposite to the peripheral face of this cylindrical portion.

Figure 16:
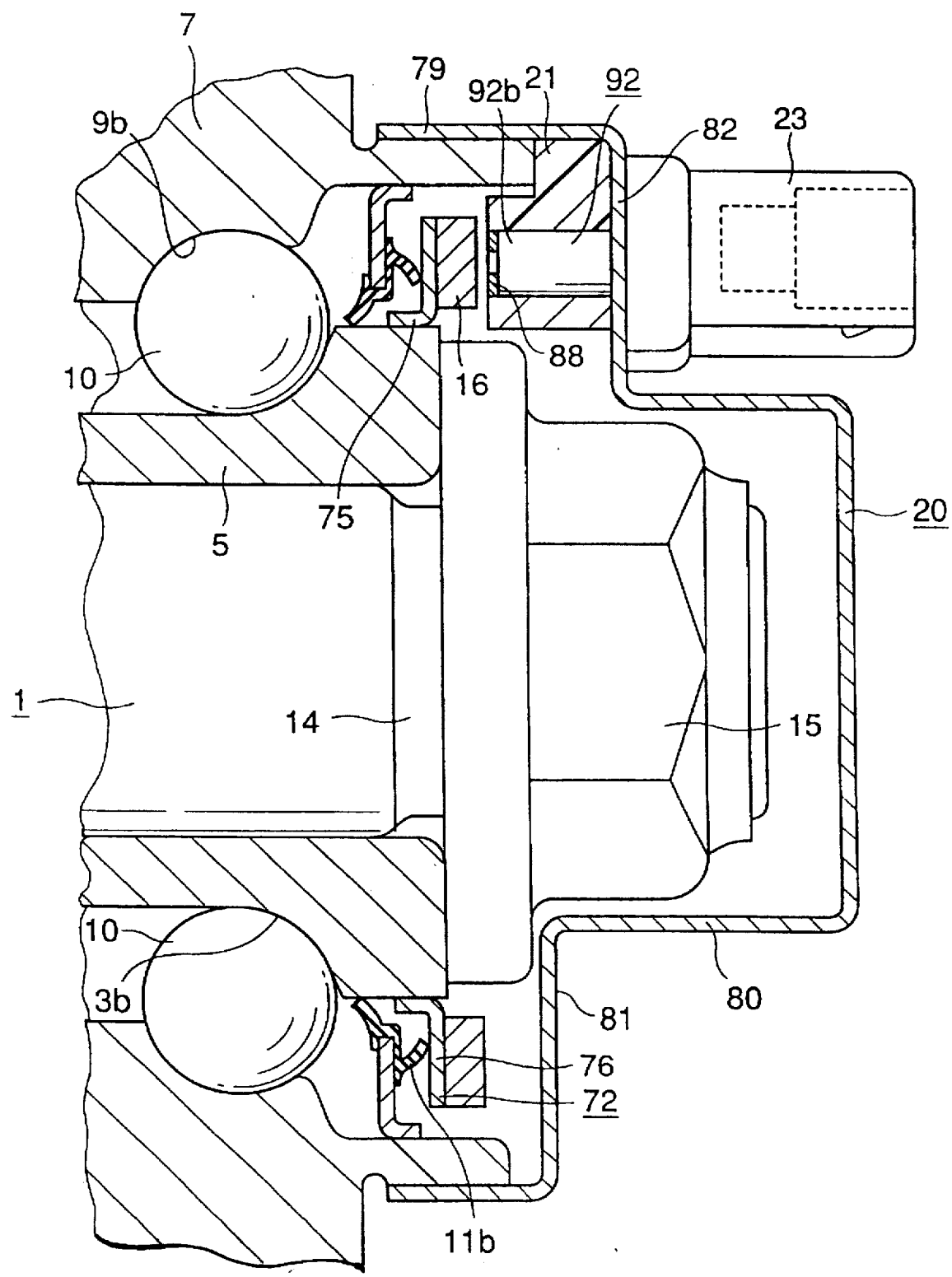
FIG. 16 is an enlarged component cross-sectional view showing a tenth embodiment of the present invention.
Figure 17:
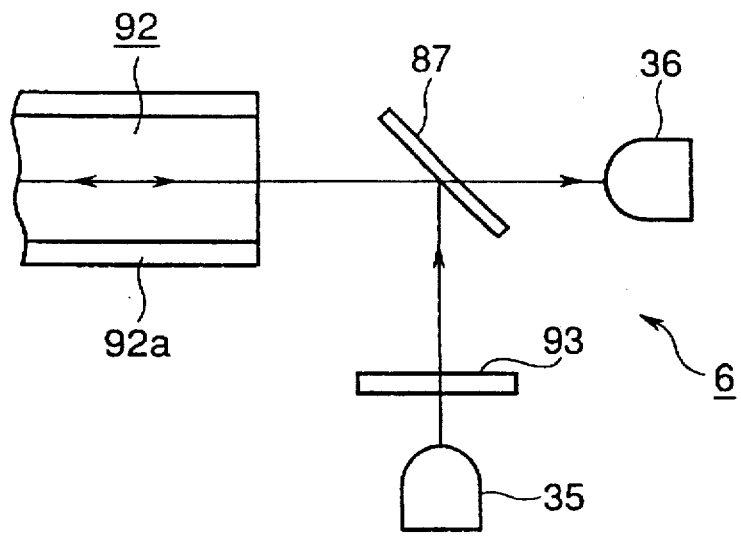
FIG. 17 is a plan schematic view of removed structural components of the sensor.

FIGS. 16 and 17 show a tenth embodiment of the present invention. With the embodiment, the sensor 6, comprising the light emitting element 35, the light receiving element 36 and the half mirror 87 is separated from the rolling bearing unit, and housed inside a controller provided on the vehicle side.

An optical fiber cable 92 is provided between the half mirror 87 of the sensor 6 and the axially inner face of the tone wheel 16.

A slit plate 88 is provided at the end face of the optical fiber cable 92 on a portion facing the axially inner face of the tone wheel 16.

Moreover, a slit plate 93 for preventing light diffraction is provided between the light emitting element 35 and the half mirror 87.

An optical connector 23 for the optical fiber cable 92, that is for connecting a cable element 92a (FIG. 17) provided on the vehicle side to a cable element 92b (FIG. 16) located inside the cover 24, is provided on the attachment portion 82 of the cover 20.

With the present embodiment constructed as described above, light shining from the light emitting element 35 which has passed through the slit plate 93, is changed in direction through 90 degrees to the direction of travel by the half mirror 87 and is then input to the optical fiber cable 92 from the base end face thereof and passes along inside the optical fiber cable 92, to reach the axially inner face of the tone wheel 16.

The light which is reflected by the axially inner face of the tone wheel 16 is again input to inside the optical fiber cable 92 from the tip end face of the optical fiber cable 92, and after passing through the half mirror 87 reaches the light receiving element 36.

In this way, with the present embodiment, the sensor 6 which takes a relatively large installation space, is located on the vehicle side away from the rolling bearing unit. Therefore the degree of freedom in locating the sensor 6 can be increased.

This arrangement can be embodied in rolling bearing units wherein installation space is particularly limited.

Moreover, since light from outside does not enter the light receiving element as noise, then more stable rotational speed detection is possible.

Figure 19:
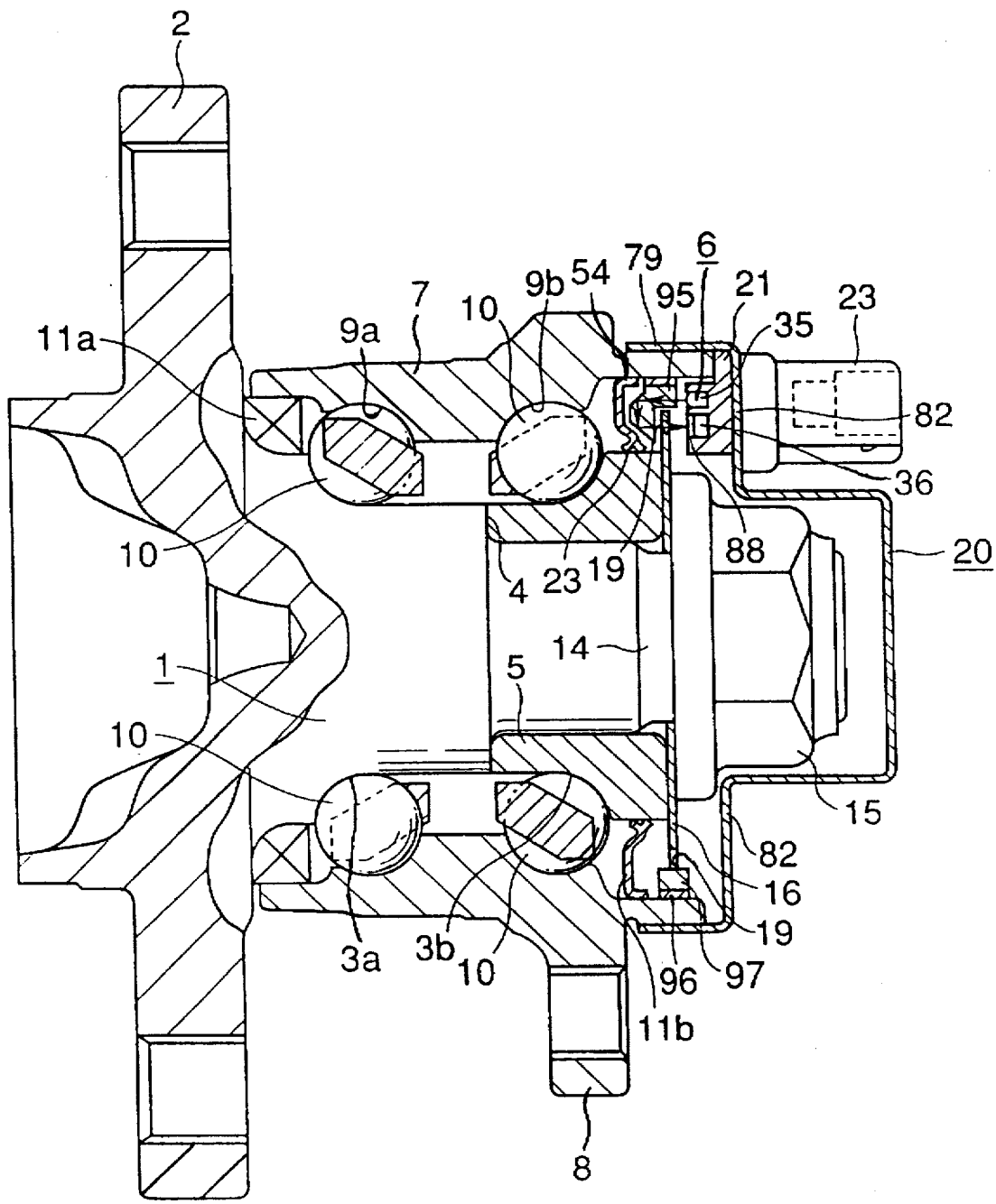
FIG. 19 is a cross-sectional view showing an eleventh embodiment of the present invention.
Figure 20:
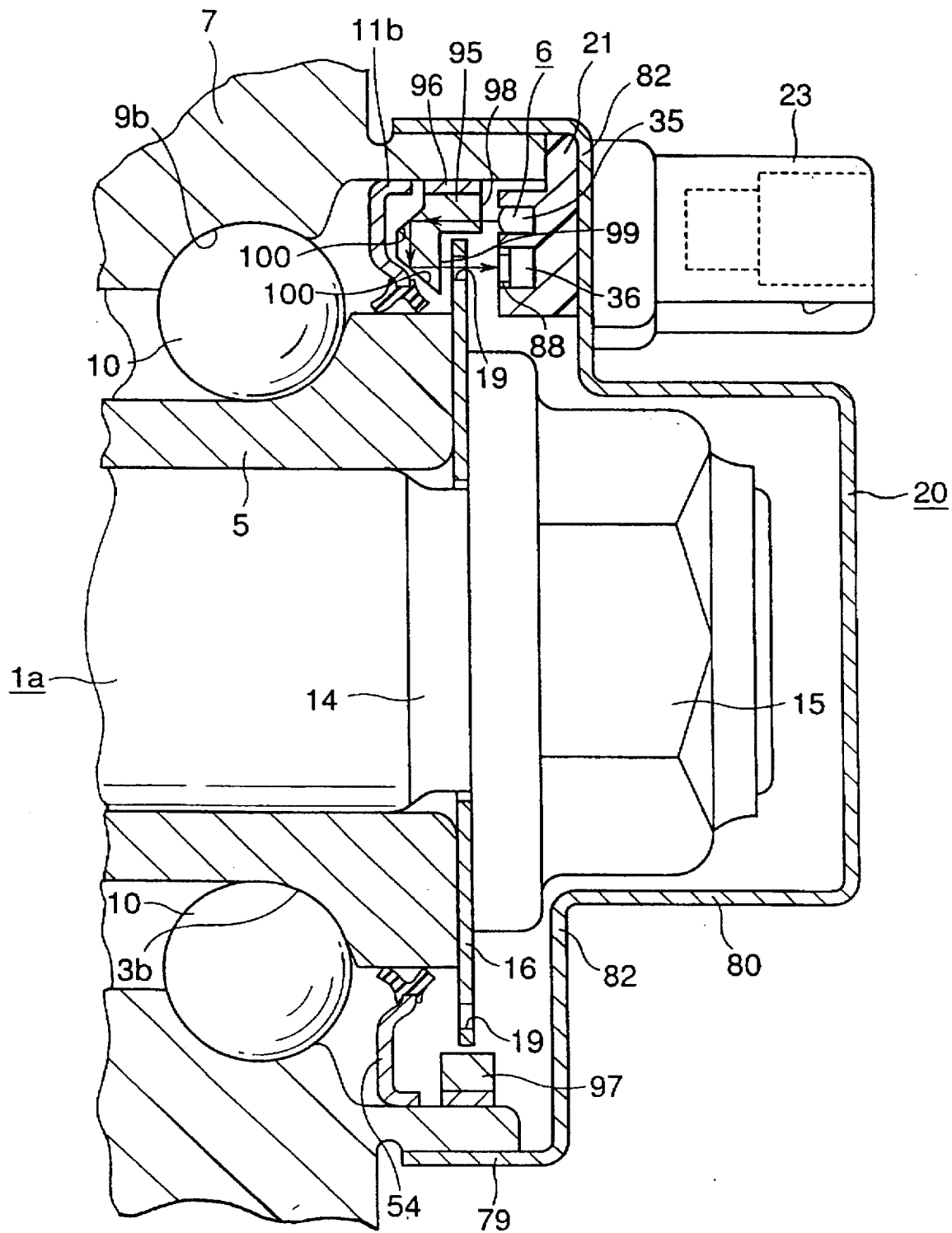
FIG. 20 is a enlarged view of the right portion of FIG. 19.

FIGS. 19 and 20 show an eleventh embodiment of the present invention. With this embodiment, a light path diverting member is located along the light path between the light emitting element 35 and the light receiving element 36.

A sensor 6 comprises a light emitting element 35 such as a semiconductor laser or light emitting diode, a light receiving element 36 such as a phototransistor, and a slit plate 88. For the light emitting diode, an infrared light emitting diode may be used. The light emitting element 35 is located radially further outward than the outer peripheral rim of the tone wheel 16 and light due to the electrical power shines freely outwards. The lead for providing power to the light emitting element 35 is passed through an aperture (not shown) to the connector 23.

On the other hand, the light receiving element 36 is faced to a portion on the axially inner face of the tone wheel 16 near the outer periphery, through the slit plate 88. A lead for taking out the signal from the light receiving element 32 is also passed through the aperture.

A plurality of slits (for example 2 or 3) are formed in the slit plate 88 at the same pitch as the apertures 19 formed in the tone wheel 16. Such a slit plate 88 is provided so as to prevent the situation wherein the light shining from the light emitting element 35 via a prism 95 towards the tone wheel 16 diffuses, so that light always passes to the light receiving element 35 irrespective of rotation of the tone wheel 16.

Consequently, if a semiconductor laser which has practically no light diffusion is used for the light emitting element 35, such a slit plate 88 can be omitted.

Moreover, the light emitting element 35 and the light receiving element 36 can be positioned in an opposite arrangement to that of the embodiment shown in the figure. In the case where the slit plate 88 is provided, the slit plate 88 may be located between the light receiving element 36 and the prism 95.

The prism 95 serving as the light path diverting member, is secured to the inner end portion of the outer ring member 7, and located on the outer side of the portion near the outer periphery of the tone wheel 16. More specifically, a ring 97 made from a synthetic resin having light transparency, is secured to the inside of a retaining ring 96 made in an annular shape from a metal plate and internally secured to the inner end portion of the outer ring member 7, and the prism 95 is integrally formed with one part of the ring 97.

The prism 95 has a light input surface 98 and a light output surface 99 at right angles to the shining direction of the light emitting element 35 and the incident light direction of the light receiving element 36, and a pair of reflecting surface 100 at right angles to each other and inclined at an angle of 45 degrees to the surface 98 and 99. The light input surface 98 is faced to the light emitting element 35 while the light output surface 99 is faced to the light receiving element 35. Consequently, the plurality of apertures 19 provided in the tone wheel 16 are located in the light path passing from the light emitting element 35 to the light receiving element 36 by way of the prism 95.

If the prism 95 is secured with an adhesive or the like to the inner face of a core member 54 of the seal ring 11b, then the amount of synthetic resin having light transparency can be reduced, so that not only can cost be reduced but also the rotational speed detection unit section can be made compact. In this case, it is preferable that an engaging portion for controlling the phase around the circumferential direction, between the core member 54 and the sensor 6, is provided between the core members 54 with the sensor 6 and the outer ring member 7, or between the core member 54 and the sensor 6.

With the speed sensing rolling bearing unit of the present invention constructed as described above, the light output from the light emitting element 35 of the sensor 6 has its direction of travel changed through 180 degrees by the prism 95, before reaching the light receiving element 36 as shown by arrows. When the tone wheel 16 rotates together with the hub 1 during vehicle traveling, the plurality of apertures 19 formed in the tone wheel 16, cross the light path connecting between the light emitting element 35 and the light receiving element 36 of the sensor 6. As a result, the detection signal from the light receiving element 36 changes at a frequency proportional to the rotational speed of the hub 1. The detection signal from the light receiving element 36 changes suddenly when an aperture 19 passes between the light emitting element 35 and the light receiving element 36, and when a light blocking portion between the adjacent apertures 19 passes between the light emitting element 35 and the light receiving element 36. Therefore, detection signal judgment is simple, and rotational speed detection can be reliably carried out.

Moreover, the prism 95, the tone wheel 16 and the sensor 6 are freely fixed to the outer ring member 7 and the hub 1 independent of each other. Consequently, the operation of assembling/securing the prism 95, tone wheel 16 and sensor 6 to the outer ring member 7 or the hub 1 while maintaining an appropriate spacing therebetween can be easily carried out.

Moreover, since the prism 95 tone wheel 16 and sensor 6 are provided independent of each other, the degree of freedom in locating these members can be maintained to some degree, increasing the degree of freedom of design, and enabling the assembly of speed sensing rolling bearing units having various constructions.

For example with the present embodiment, by arranging the light emitting element 35 and the light receiving element 36 in line in the radial direction, then the axial dimension of a sensor fitted with these emitting and receiving elements 35 and 36 can be reduced.

On the other hand, if for example at least one part of the tone wheel is made into a cylindrical portion and light transparent portions such as apertures are formed in the cylindrical portion, then the sensor 6 and a light path diverting member such as a prisms 95 can be respectively positioned on the outer peripheral side and the inner peripheral side of the cylindrical portion, or vice versa.

For the material of the tone wheel 16, instead of the metal plate of the present embodiment, a material such as a photosensitive resin, or a light transparent resin may be used.

Also, the shape of the tone wheel 16 can be changed from the disk shape as with the present embodiment to other shapes such as an annular shape of L-shape in cross section or a cylindrical shape. Moreover, the locations of the respective members can also be changed.

In these cases it is not necessary that the light path diverting member is used to change the traveling path of the light through 180 degrees. For example, around 90 degrees may be satisfactory, the requirement being that the change in light path is determined in accordance with the location of the light emitting element 35 and the light receiving element 36 of the sensor 6.

Figure 21:
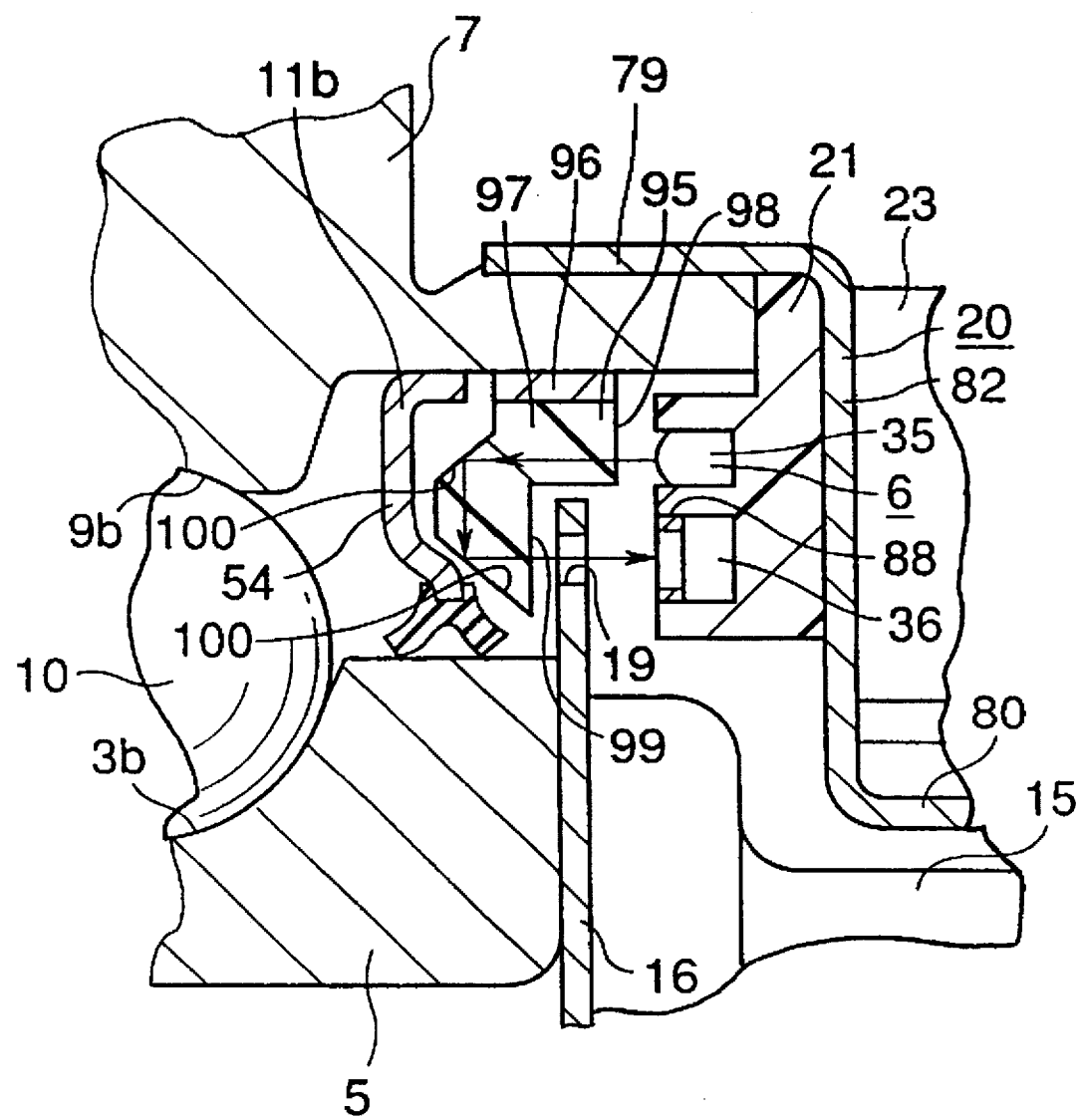
FIG. 21 is a enlarged view of a central upper portion of FIG. 20.
Figure 22:
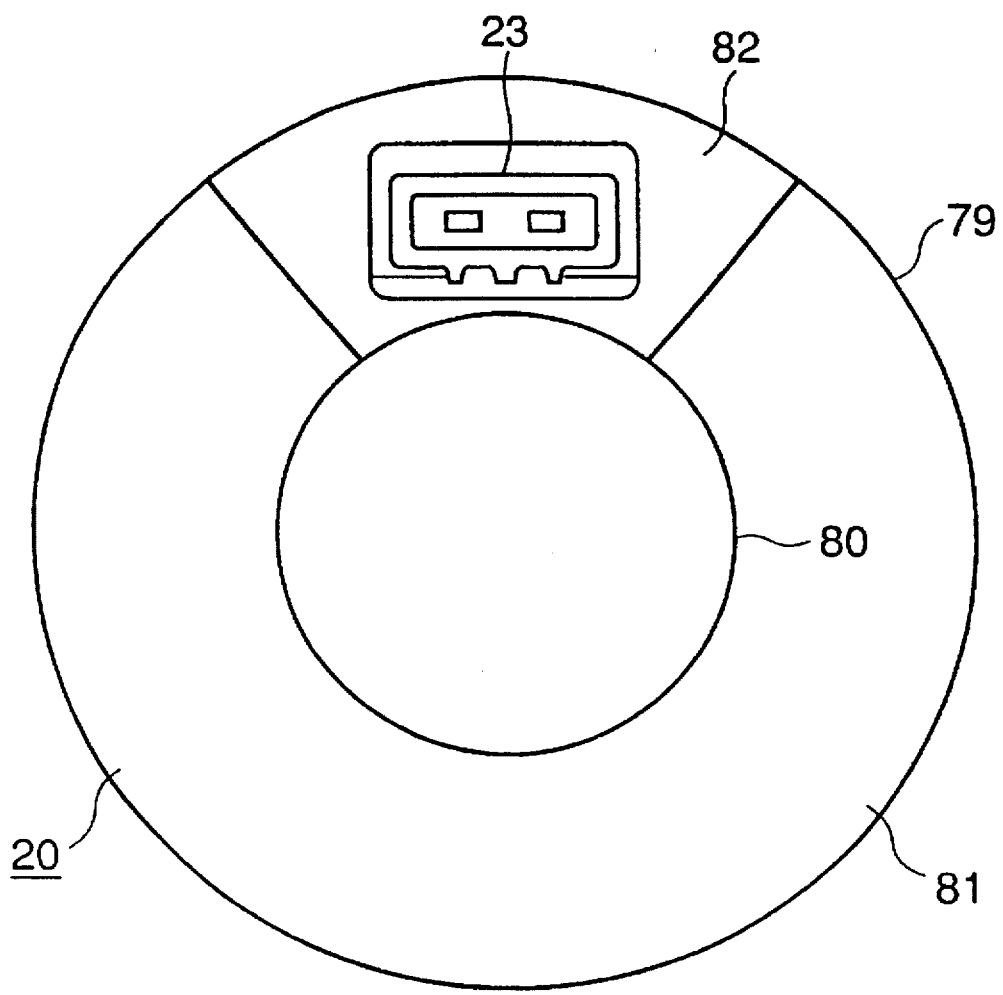
FIG. 22 is a view from the right of FIG. 19, of a cover provided with a connector.
Figure 23:
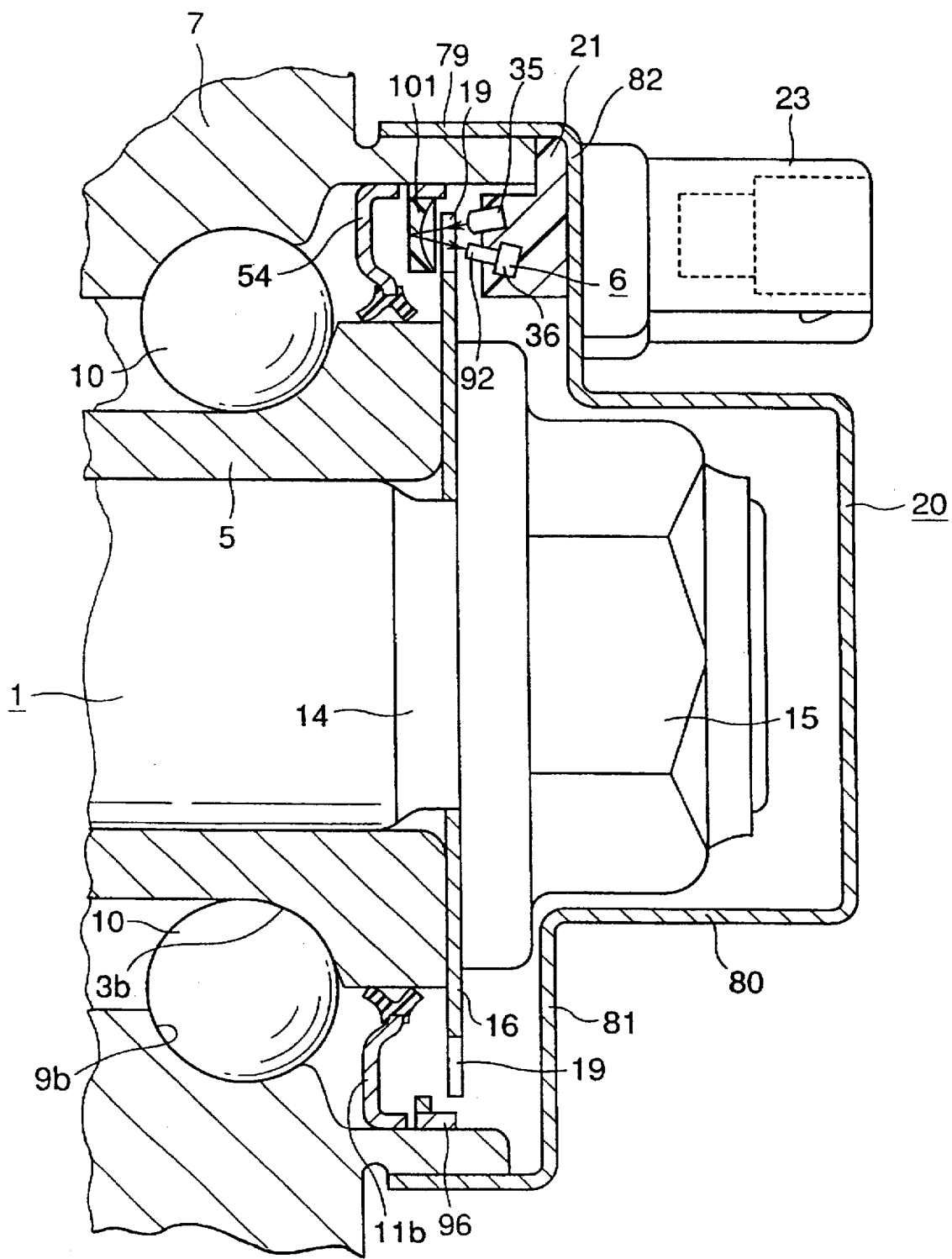
FIG. 23 is a view similar to that of FIG. 20, showing an eleventh embodiment of the present invention.
Figure 24:
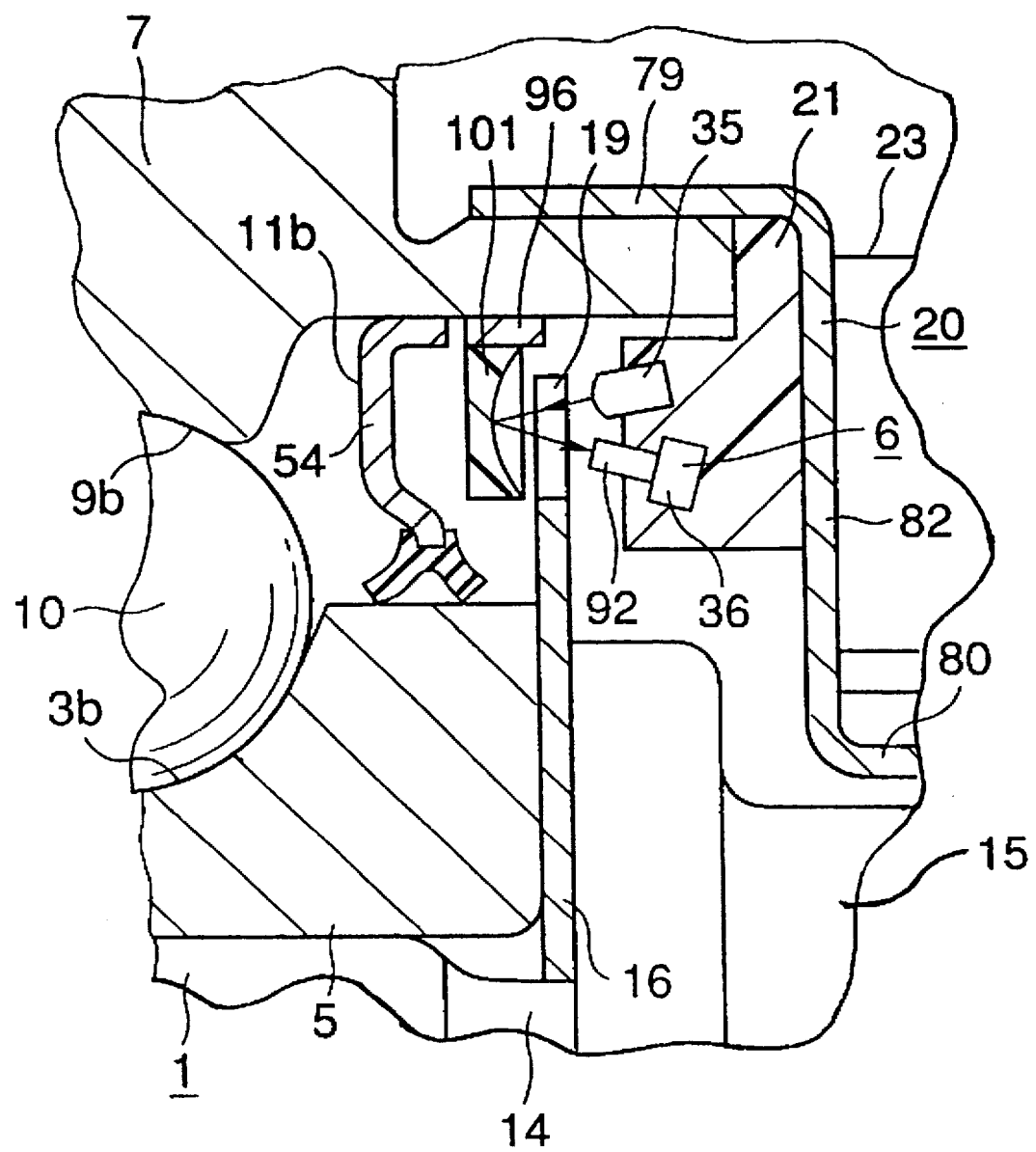
FIG. 24 is a enlarged view of a central upper portion of FIG. 23.

FIGS. 23 and 24 shown an eleventh embodiment of the present invention. With this embodiment, a large number of cut-outs 19 are formed at even spacing in the outer peripheral rim of a tone wheel 16. The cut-outs 19 serve as light transparent portions. Moreover, for the light path diverting member, instead of the prism 95 (FIGS. 19–21) as with the tenth embodiment, a reflecting plate 101 is used. The reflecting plate 101 is made from a synthetic resin with a spherical concave face formed in one portion. The reflectivity of the spherical concave face is improved by vapor depositing a material such as silver or aluminum.

The light emitting element 35 and the light receiving element 36 of a sensor 6 are located so that their light paths are inclined to each other, and so that the incident angle and the reflection angle at a portion of the reflecting plate 101 are the same.

With the embodiment shown in the figures, an optical fiber 92 is positioned between the tone wheel 16 and the light receiving element 36 and aligned with the direction of the light path. The tip end face of the optical fiber 92 is positioned close to the portion near the outer periphery of the tone wheel 16 in which the cut-outs 19 are formed. Such an optical fiber 92 serves the role of reliably guiding the light passing through one or other of the cut-outs 19 to the light receiving element 36. For this purpose, a condensing lens can also be used instead of the optical fiber 92. In particular, if for the optical fiber 92 a fine fiber is used facing only one of the cut-outs 92, then even for the case wherein the light output from the light emitting element 35 diffuses, then excess light can be reliably prevented from passing to the light receiving element 36, so that rotational speed detection accuracy can be improved. Other details of the construction and operation are the substantially same as for the tenth embodiment.

With the speed sensing rolling bearing unit according to the present invention, due to the above described construction and operation, traveling speed can be reliably detected even at very low speeds, thus enabling an anti-lock braking system (ABS) or a traction control system (TCS) to be more accurately controlled. Furthermore, since it is possible to accurately measure the speed difference between for example a right wheel and a left wheel, then a change in traveling direction or measured distance of a vehicle can be accurately measured, so that an accurate independent traveling type navigation system can be realized.

What is claimed is:

1. A rolling bearing unit having a photosensor for detecting rotation speed comprising:

a fixed ring having an end portion and a peripheral face formed with a first raceway, a rotating ring having an end portion and a peripheral face formed with a second raceway, a plurality of rolling elements rotatably provided between the first and second raceways, a cover securely mounted to the end portion of the fixed ring to sealingly prevent foreign matters from entering inside, a photosensor for emitting light in a path mounted to the cover and comprising a light-emitting element and a light-receiving element for receiving the light from the light emitting element, a tone wheel securely mounted to the end portion of the rotating ring, and having a light-transmitting portion and light-blocking portion arranged circumferentially with a uniform interval for detection by the photosensor, and a seal ring for separating a portion where the sensor is provided from a portion where the rolling elements are provided.

2. The rolling bearing element of claim 1, wherein the tone wheel is made from a thin metal plate and formed in a generally annular shape, and comprises a cylindrical mounting portion with an end edge formed by folding the thin metal plate back 180 degrees so as to be fitted to part of the rotating ring, a first bent portion extending radially from the end edge of the mounting portion so as to be abutted to the end portion of the rotating ring, and a second bent portion radially extending from the end edge of the mounting portion, such that the first and second bent portions are bent at right angles to the opposite directions and substantially flush with each other.

3. The rolling bearing unit of claim 1, wherein the tone wheel has a cylindrical portion which is to be detected by the sensor, the light-emitting element of the sensor is provided on the radially outer side while the light-receiving element is provided on the radially inner side, and the cover is axially movable after the tone wheel is mounted, so that the cover is fitted to the fixed ring.

4. The rolling bearing unit of claim 1, wherein the tone wheel has a cylindrical portion which is to be detected by the sensor, the light-emitting element is provided on the radially inner side and the light-receiving element is provided on the radially outer side, and the cover is axially movable after the tone wheel is mounted, so that the cover is fitted to the fixed ring.

5. The rolling bearing unit of claim 1, wherein the tone wheel has an outer diameter and a disc portion for detection, and the cover has a bottom plate portion formed with an opening the maximum width of which is larger than the outer diameter of the tone wheel, a base plate mounted to the cover, and a seal member provided between the cover and the base plate.

6. The rolling bearing of claim 1, wherein the tone wheel is comprised of an attachment base securely fitted to the rotating ring and a photosensitive resin formed in a generally annular shape and connected to the attachment base.

7. The rolling bearing unit of claim 1, further comprising a light path diverting member supported by one of the fixed ring and rotating ring so as to change the path of the light emitted by the light-emitting element toward the light-receiving element.

8. The rolling bearing unit of claim 1, wherein the tone wheel comprises a first flange portion having a larger diameter,
- a first cylindrical portion having a larger diameter and fitted to the rotating ring,
- a second flange portion having a smaller diameter and abutted to the rotating ring, and a second cylindrical portion which is to be detected by the sensor, while the seal ring is mounted to the fixed ring and has a seal lip portion which is placed in contact with the first flange portion and the first cylindrical portion of the tone wheel.

9. The rolling unit of claim 1, wherein the cover has an inner periphery provided with a seal lip in a sealing relationship with the rotating ring.

* * * * *